(12) United States Patent
Ozawa et al.

(10) Patent No.: US 7,331,264 B2
(45) Date of Patent: Feb. 19, 2008

(54) MITER SAW HAVING MECHANISM FOR ADJUSTING TILTING ANGLE OF CIRCULAR SAW BLADE

(75) Inventors: Hiromi Ozawa, Hitachinaka (JP);
Shigeharu Ushiwata, Hitachinaka (JP);
Ryuichi Imamura, Hitachinaka (JP);
Hideaki Terashima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/169,918

(22) Filed: Jun. 30, 2005

(65) Prior Publication Data
US 2006/0000331 A1    Jan. 5, 2006

(30) Foreign Application Priority Data
Jun. 30, 2004  (JP) ............................ P2004-194995

(51) Int. Cl.
*B23D 45/14*    (2006.01)
*B27B 5/20*    (2006.01)

(52) U.S. Cl. ..................... 83/471.3; 83/473; 83/490; 83/581

(58) Field of Classification Search ............... 83/471.3, 83/473, 581, 522.15, 472, 477, 477.1, 490, 83/698.41, 698.31
See application file for complete search history.

(56) References Cited

U.S. PATENT DOCUMENTS

| | | | |
|---|---|---|---|
| 4,641,557 A | 2/1987 | Steiner et al. | |
| 4,754,276 A | 6/1988 | Carlson et al. | |
| 5,249,496 A | 10/1993 | Hirsch et al. | |
| 5,829,333 A * | 11/1998 | Itzov | 83/471.3 |
| 6,173,635 B1 * | 1/2001 | Chang | 83/471.3 |
| 6,860,183 B1 * | 3/2005 | Chen | 83/471.3 |
| 7,021,186 B2 * | 4/2006 | Brazell et al. | 83/471.3 |
| 2001/0000856 A1 | 5/2001 | O'Banion | |
| 2004/0089125 A1 * | 5/2004 | Schoene et al. | 83/471.3 |
| 2006/0000328 A1 * | 1/2006 | Terashima et al. | 83/471.3 |
| 2006/0000329 A1 * | 1/2006 | Terashima et al. | 83/471.3 |
| 2006/0000330 A1 * | 1/2006 | Terashima et al. | 83/471.3 |

FOREIGN PATENT DOCUMENTS

| | | |
|---|---|---|
| DE | 198 32 984 | 1/1999 |
| JP | 8-336802 | 12/1996 |
| JP | 2000-254817 | 9/2000 |

* cited by examiner

*Primary Examiner*—Stephen Choi
(74) *Attorney, Agent, or Firm*—Antonelli, Terry, Stout & Kraus, LLP.

(57) ABSTRACT

A miter saw including a base, turntable, and circular saw unit supported to the turntable. A turntable is rotatable about its axis. The turntable has a tilting motion support. A support section has a tilt section tiltingly movable relative to the tilt motion support, and pivotally movably supports the circular saw unit. A clamp shaft is provided for clamping the tilting section to the tilt motion support. A tilt amount fine control unit is provided for performing fine control to the tilting angle, and includes an arcuate gear teeth section provided at the tilt motion support, rotation shaft for moving the arcuate gear teeth, and adjustment knob supported on the clamp shaft for rotating the rotation shaft. A neck table section is provided at a front side of the turntable, and includes a digital display for displaying a lateral tilting angle of the circular saw unit.

15 Claims, 29 Drawing Sheets

MITER SAW HAVING MECHANISM FOR ADJUSTING TILTING ANGLE OF CIRCULAR SAW BLADE

BACKGROUND OF THE INVENTION

The present invention relates to a miter saw, and more particularly, to such a miter saw capable of performing tilt cutting in which a side surface of the circular saw blade extends obliquely relative to an upper surface of a base section.

In a conventional table top circular saw, a workpiece such as a wood block is mounted on a base section, and the workpiece is cut by a circular saw unit vertically movable above the base section. If the workpiece is to be cut obliquely relative to a vertical plane, posture of the workpiece on the base section must be changed. Thus, workability may be lowered.

Japanese Patent Application Publication No. 2000-254817 discloses a miter saw including a base section, a support section, and a circular saw unit. The base section includes a base and a turntable mounted on the base and rotatable about its axis. A workpiece is mounted on the turntable. The support section upwardly extends from the base section and is laterally tiltable. The circular saw unit is positioned above the base section and is pivotally movably supported to the support section. The circular saw unit includes a circular saw blade and a motor for rotating the blade. Since the support section is pivotally movable in the lateral direction, the circular saw blade is laterally tiltable. Thus, an angle defined between a side surface of the circular saw blade and an upper surface of the base section can be changed.

In order to cut the workpiece at a desired tilting angle, a protractor must be provided at a pivot axis position so as to recognize the relative position between the base section and the circular saw unit. In this case, the tilting position is adjusted by observing a scale of the protractor. As a result, inevitable large error results due to the visual observation. It would be extremely difficult to accurately provide the tilting angle at the rate of 0.1 degree.

Further, the circular saw unit may be tiltingly moved by its own weight because of the tiltable arrangement of the circular saw unit. Therefore, in order to set the circular saw unit at a desired tilting angle, the tilting angle of the circular saw unit must be set to a desired scale angle while holding the circular saw unit with user's hand against the own weight. Then, the tilting angle must be fixed. This procedure requires a skill and a labor for accurate positioning.

SUMMARY OF THE INVENTION

It is therefore an object of the present invention to provide a miter saw capable of providing a desired tilting angle of the circular saw unit with high accuracy and less labor even at a fine tilting angle, and capable of providing clear visibility with respect to the tilting angle.

This and other object of the present invention will be attained by a miter saw including a base section, a circular saw unit, a support section, a clamp mechanism, and a tilt amount fine control unit. The base section supports a workpiece thereon, and has a tilt support. The circular saw unit rotatably supports a circular saw blade. The support section pivotally movably supports the circular saw unit at a position above the base section. The support section has a tilting section laterally tiltingly movable together with the circular saw unit and is supported to the base section. The tilt support supports the tilting section in contact therewith. The tilting section is tiltingly movable along a tilting locus. The clamp mechanism presses the tilting section against the tilt support for fixing a lateral tilting posture of the support section. The tilt amount fine control unit is disposed between the tilting section and the tilt support.

Preferably, the tilt amount fine control unit includes an arcuate section, a rotation shaft, and an adjustment knob. The arcuate section is provided at the tilting locus and is movable integrally with the tilting section. The rotation shaft is rotatably supported to the tilt support and is associated with the arcuate section for tiltingly moving the tilting section. The adjustment knob is rotatably supported to the tilt support and is associated with the rotation shaft for rotating the rotation shaft about an axis thereof.

In another aspect of the invention, there is provided a miter saw including the base, the circular saw unit, the a support section, a rotatable lever that fixes the tilting section to the tilt support upon rotating operation, and a rotatable adjustment knob movable along with the tilting section and associated with the tilt support.

DETAILED DESCRIPTION OF THE PREFERRED EMBODIMENTS

Figure 1:
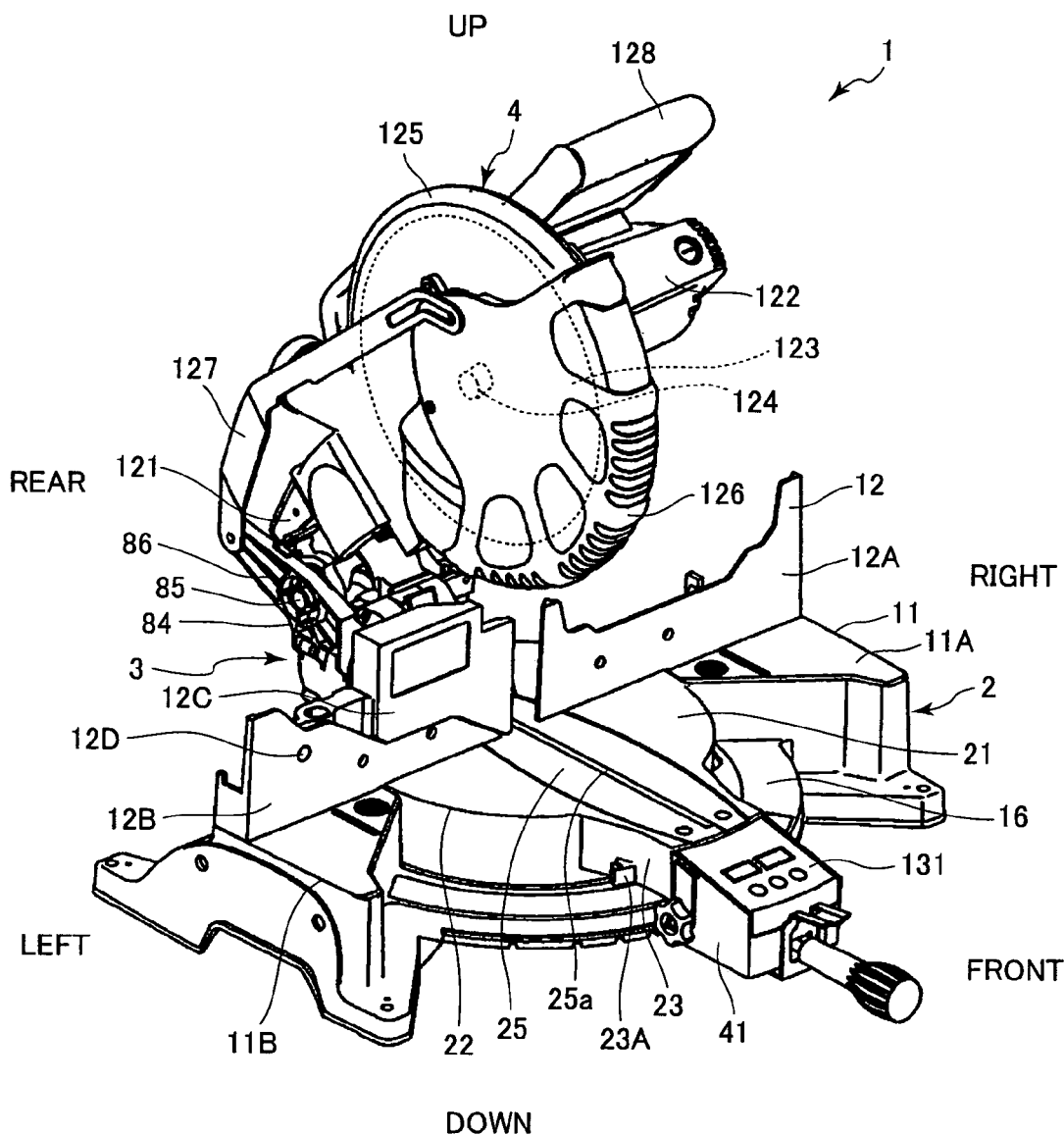
FIG. 1 is a perspective view of a miter saw as viewed from its front side according to a first embodiment of the present invention.
Figure 2:
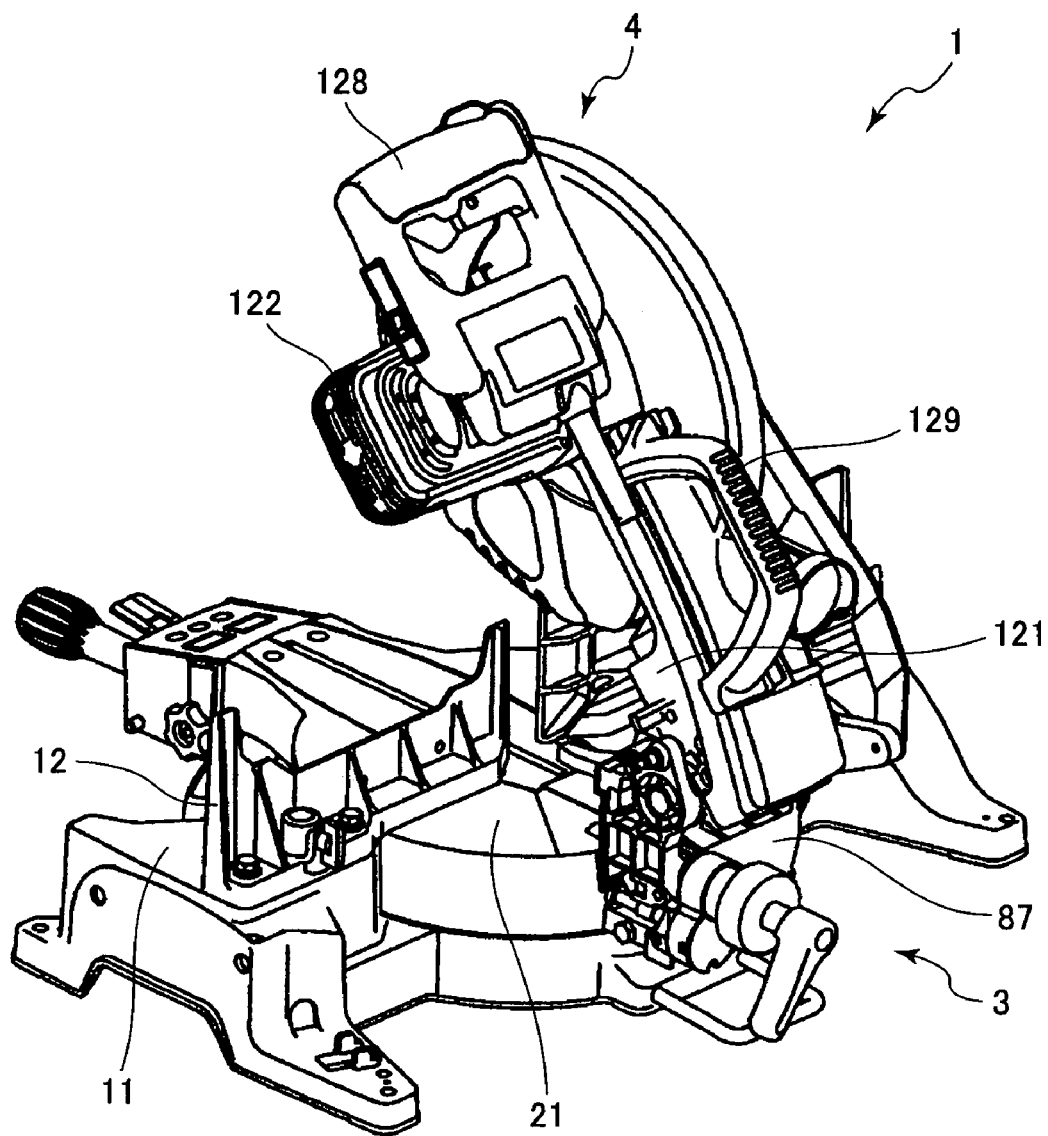
FIG. 2 is a perspective view of the miter saw as viewed from its rear side according to the first embodiment.

A miter saw according to a first embodiment of the present invention will be described with reference to FIGS. 1 through 31, 46 and 47. As shown in FIG. 1, the miter saw 1 includes a base section 2 installed on a stand or a floor for mounting thereon a workpiece such as a wood, a circular-saw unit 4 that cuts a workpiece, and a support section 3 supporting the circular saw unit 4 pivotally movably toward and away from the base section 2 and laterally tiltably relative to the base section 2.

As shown in FIG. 1, the base section 2 includes a base 11 serving as a ground section, a turntable 21 and a fence 12. The turntable 21 is supported on the base 11 and is rotatable about its axis with respect to the base 11. The turntable 21 cooperates with the base 11 to support a workpiece such as a wood block. The fence 12 laterally extends over the base 11 and is supported on the base 11. The fence 12 has an abutment surface extending in the lateral direction and facing frontward in contact with a side surface of the workpiece for positioning the workpiece. In the following description, the facing side of the abutment surface is defined as the front side, the extending direction of the fence is defined as leftward/rightward or lateral direction, and a ground side of the base 11 is defined as a lower side.

Figure 3:
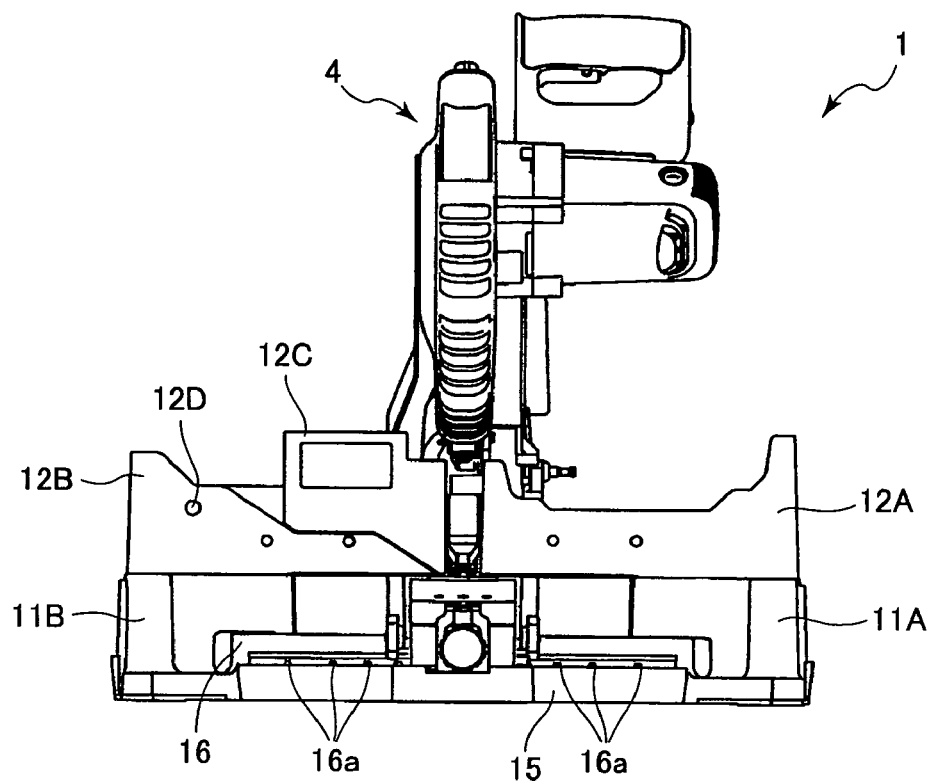
FIG. 3 is a front view of the miter saw according to the first embodiment.
Figure 5:
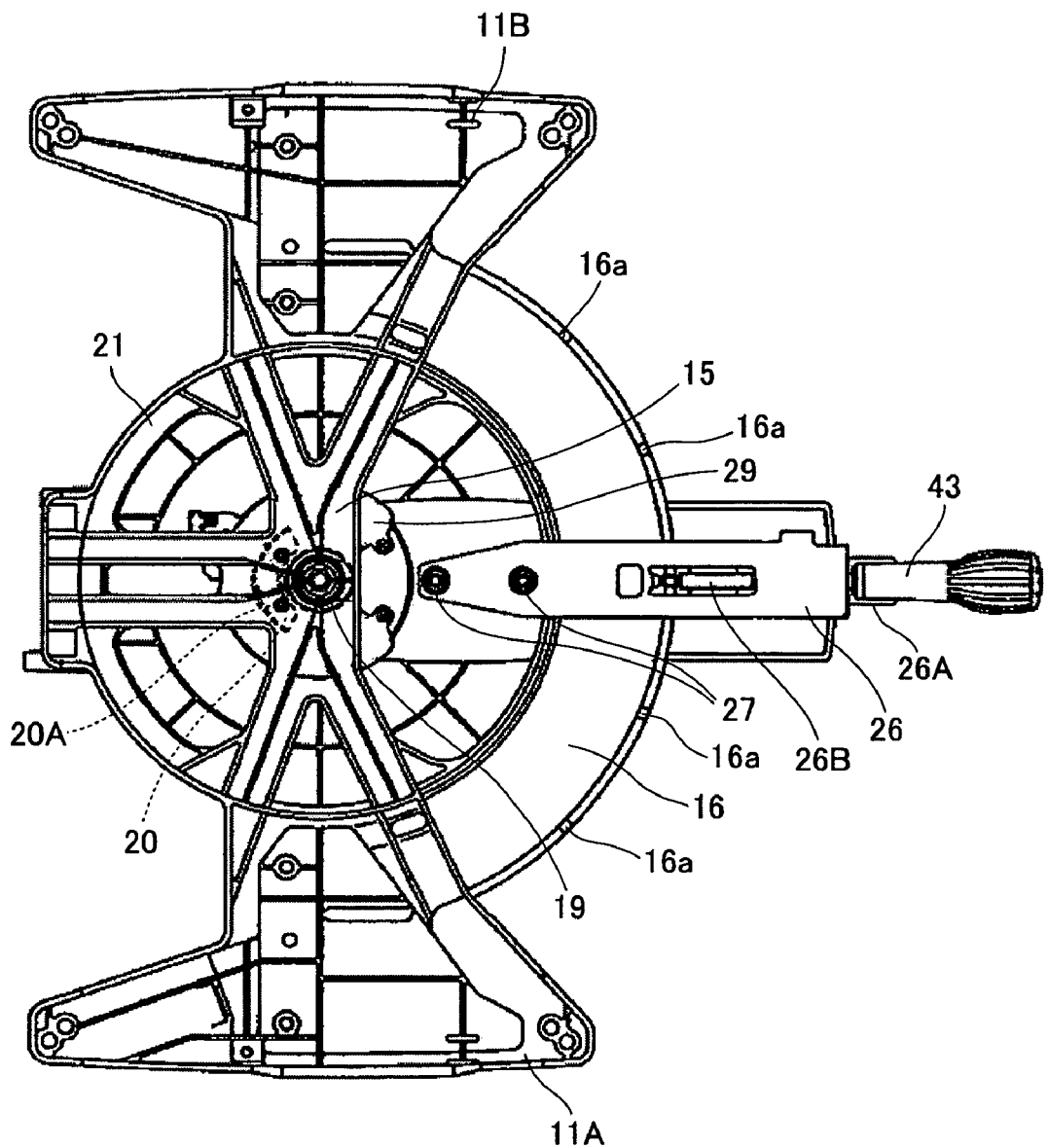
FIG. 5 is a bottom view of the miter saw according to the first embodiment.

As shown in FIGS. 1 and 3, the base 11 includes a right base 11A and a left base 11B interposing the turntable 21 therebetween. Each top surface of each base 11A, 11B serves as a workpiece mounting surface. As shown in FIGS. 3 and 5, the base 11 also includes an arcuate portion 16 disposed between the right base 11A and the left base 11B and protruding frontward. The arcuate portion 16 has a peripheral side whose center is coincident with a rotation axis of the turntable 21. As shown in FIG. 5, the peripheral side has a lower end formed with a plurality of locking grooves 16a engageable with a protruding portion 26B of a lock lever 26 described later.

The plurality of locking grooves 16a are positioned at a predetermined angles such as 15 degrees, 30 degrees and 45 degrees relative to a reference axis (0 degrees) extending frontward from the rotation axis of the turntable 21 in a direction perpendicular to the fence 12. Further, as shown in FIG. 5, a linking portion 15 is provided for linking the right base 11A to the left base 11B at a position in direct confrontation with the installation spot such as a floor. The linking portion 15 has a center region provided with a rotation support 19 for rotatably supporting the turntable 21. The rotation support 19 defines the rotation axis.

Figure 4:
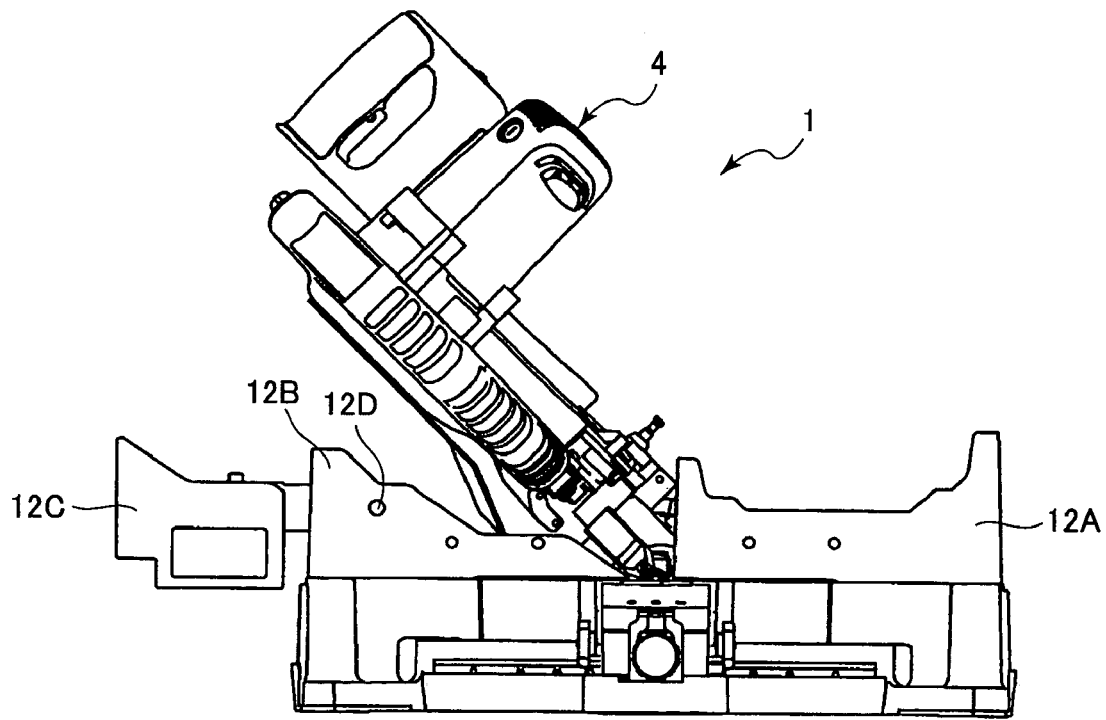
FIG. 4 is a front view of the miter saw according to the first embodiment, and particularly showing a tilting state of a circular saw unit.

As shown in FIGS. 1 and 3, the fence 12 includes a right fence 12A fixed to the right base 11A and a left fence 12B fixed to the left base 11B. These fences 12A, 12B have abutment surfaces in abutment with the workpiece, and the abutment surfaces extend in a direction substantially perpendicular to the upper surfaces of the base 11 carrying the workpiece. As shown in FIG. 3, the left fence 12B has a pivot shaft 12D, and a separate pivotable fence 12C is pivotally supported to the left fence 12B through the pivot shaft 12D. Thus, as shown in FIG. 4, a direct abutment of a circular saw blade 123 described later in the circular-saw unit 4 against the fence 12 can be avoided by pivotally moving the pivotable fence 12C away from a locus of the blade 123, even if the circular saw unit 4 is tilted laterally.

Figure 6:
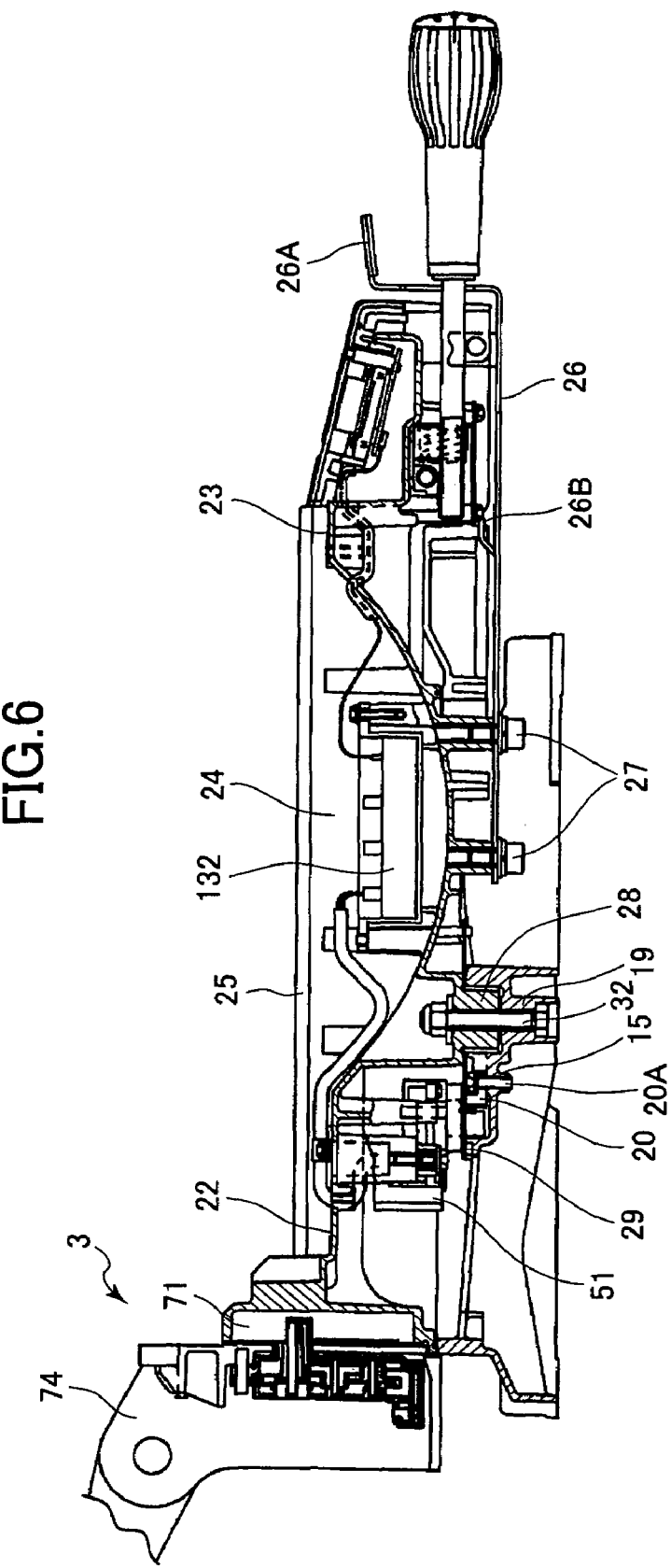
FIG. 6 is a cross-sectional left side view of the miter saw according to the first embodiment.

As shown in FIGS. 5 and 6, an arcuate outer gear teeth segment 20 is fixed with a screw 20A to an upper surface of the linking portion 15 at a position rearward of the rotation support 19. The arcuate outer gear teeth segment 20 is on an imaginary circle whose center is coincident with the central axis of the rotation support 19. A rotation amount detection unit 51 (FIG. 11 and described later) is displaceable relative to the arcuate outer gear teeth segment 20 for detecting an angular rotation amount of the turntable 21.

As shown in FIG. 1, the turntable 21 includes a circular table section 22 interposed between the right and left bases 11A and 11B, and having an upper surface on which a workpiece is mounted. The circular table section 22 defines therein a rotation axis of the turntable 21. The turntable 21 also includes a neck table section 23 extending frontward from the circular table section 22 and positioned above the arcuate portion 16. The upper surfaces of the circular table section 22 and the neck table section 23 are flush with the upper surface of the base 11. A semicircular recess 24 is formed at the turntable 21. The semicircular recess 24 is open at the upper surfaces of the circular table section 22 and the neck table section 23 in a fusiform-shaped configuration, and has a semi-circular contour in the vertical direction in conformance with the contour of the circular saw blade 123. The upper opening is covered with a fusiformed shaped slit plate 25 having a center portion formed with a slit 25a which allows the circular saw blade 123 to pass therethrough when the circular saw unit 4 is pivotally moved toward the turntable 21.

A battery box 132 (FIG. 6) is disposed in the semi-circular recess and at a left side of the slit 25a. The battery box 132 is adapted for supplying electric current to a microcomputer 142 described later.

Figure 7:
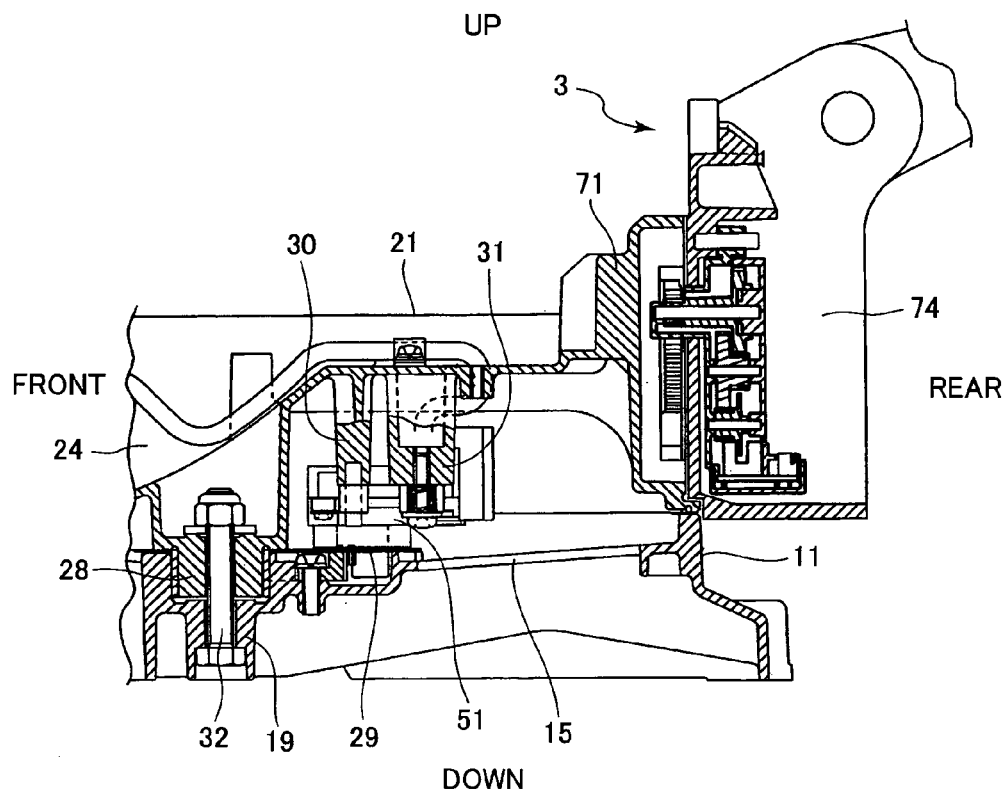
FIG. 7 is an enlarged cross-sectional right side view showing an essential portion of the miter saw according to the first embodiment.

As shown in FIGS. 6 and 7, a rotation shaft section 28 is disposed at a bottom of the semi-circular recess 24 and at a position in alignment with the center of the circular table section 22. The rotation shaft section 28 is housed in a space defined by the rotation support 9 of the base 11. The rotation shaft section 28 and the rotation support 9 are formed with through holes through which a bolt 32 extends so as to allow the turntable 21 to be rotatable relative to the base 11 without disassembly of the turntable 21 from the base 11.

A protrusion 23A (FIG. 1) protrudes from a left side of the neck table section 23. The protrusion 23A is abuttable against the left base 11B when the turntable 21 is angularly rotated. A corresponding protrusion also protrudes from a right side of the neck table section 23 so as to be abuttable against the right base 11A. Thus, the turntable 21 is angularly rotatable relative to the base 11 within a range defined by the abutments.

Figure 8:
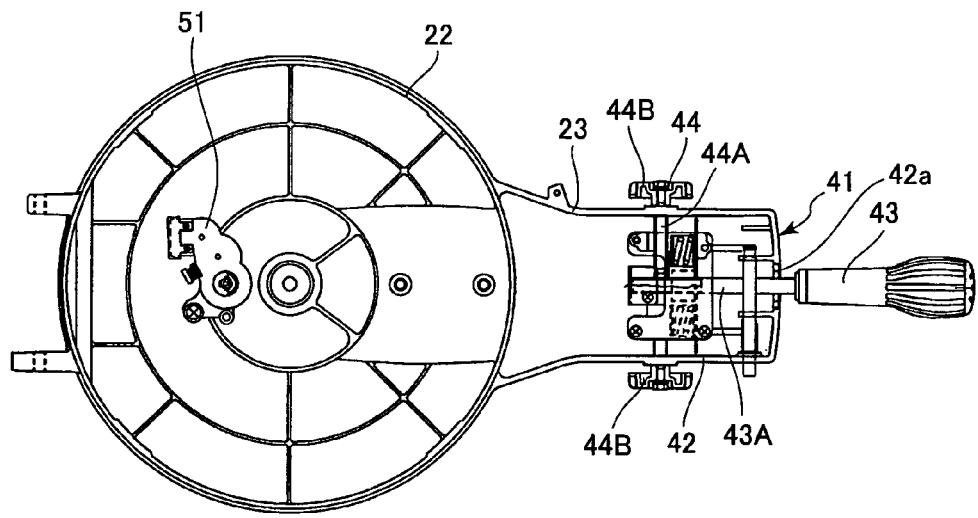
FIG. 8 is a bottom view of a turntable in the miter saw according to the first embodiment.

An adjustment unit 41 (FIG. 1) is provided at a front end of the neck table section 23 for adjusting angular rotational position of the turntable 21. As shown in FIGS. 7 and 8, a pin fixing portion 30 and a screw fixing portion 31 protrude from a lower face of the turntable 21. Further, the rotation amount detection unit 51 (FIG. 8) in association with the outer gear teeth segment 20 of the base 11 is disposed below the pin fixing portion 30 and the screw fixing portion 31 for detecting the angular rotation amount of the turntable 21.

As shown in FIGS. 5 and 6, a resilient lock lever 26 is fixed with screws 27 to the lower surface of the turntable 21 at a position below the arcuate portion 16 and in front of the rotation shaft section 28. The lock lever 26 extends to a front end position of the adjustment unit 41 (FIG. 8). The front end portion of the lock lever 26 is positioned below the adjustment unit 41, and is folded upwardly along a front end surface of the adjustment unit 41. A push-down portion 26A is provided at the free front end of the lock lever 26. The lock lever 26 is provided with an upward protrusion 26B at a position in confrontation with a lower end face of the peripheral wall of the arcuate portion 16. The upward protrusion is engageable with a selected one of the plurality of locking grooves 16a formed at the lower end face of the arcuate portion 16. Accordingly, angular rotational position of the turntable 21 is fixed by the engagement of the upward protrusion 26B with the selected one of the locking grooves 16a, since the lock lever 26 is angularly moved together with the angular movement of the turntable 21.

Figure 9:
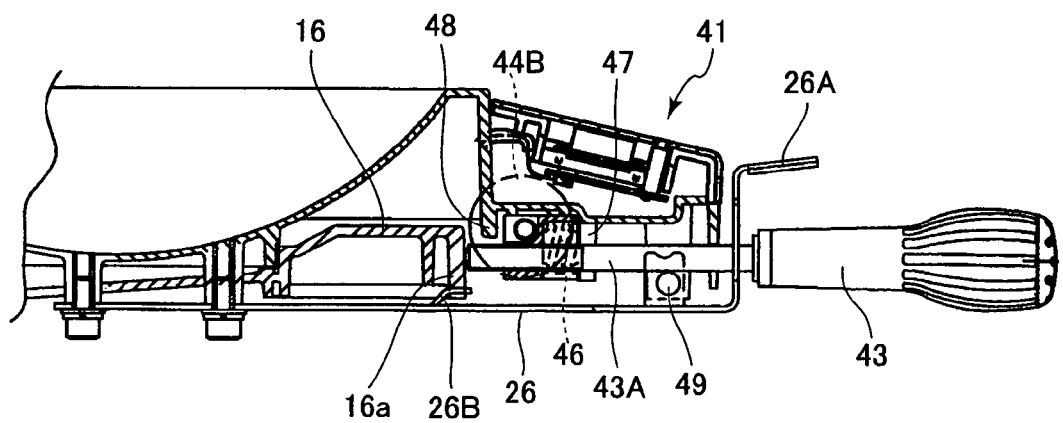
FIG. 9 is a cross-sectional right side view showing an adjustment mechanism for fine-adjusting the rotational position of the turntable in the miter saw according to the first embodiment.
Figure 10:
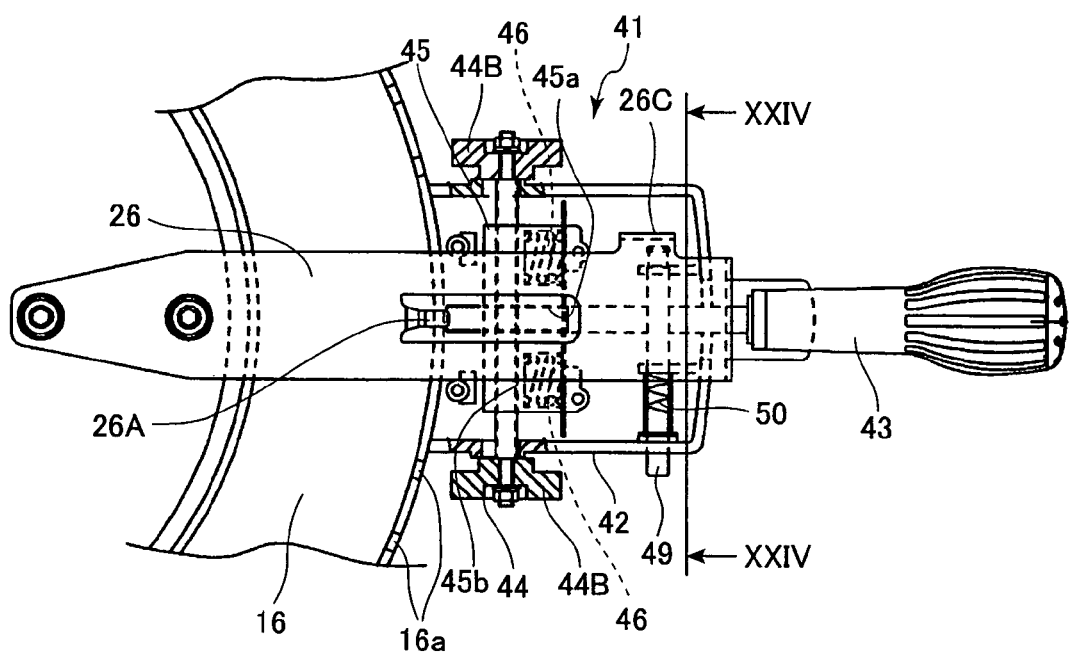
FIG. 10 is a sight-through view as viewed from the bottom for showing the adjustment mechanism for fine-adjusting the rotational position of the turntable in the miter saw according to the first embodiment.
Figure 25:
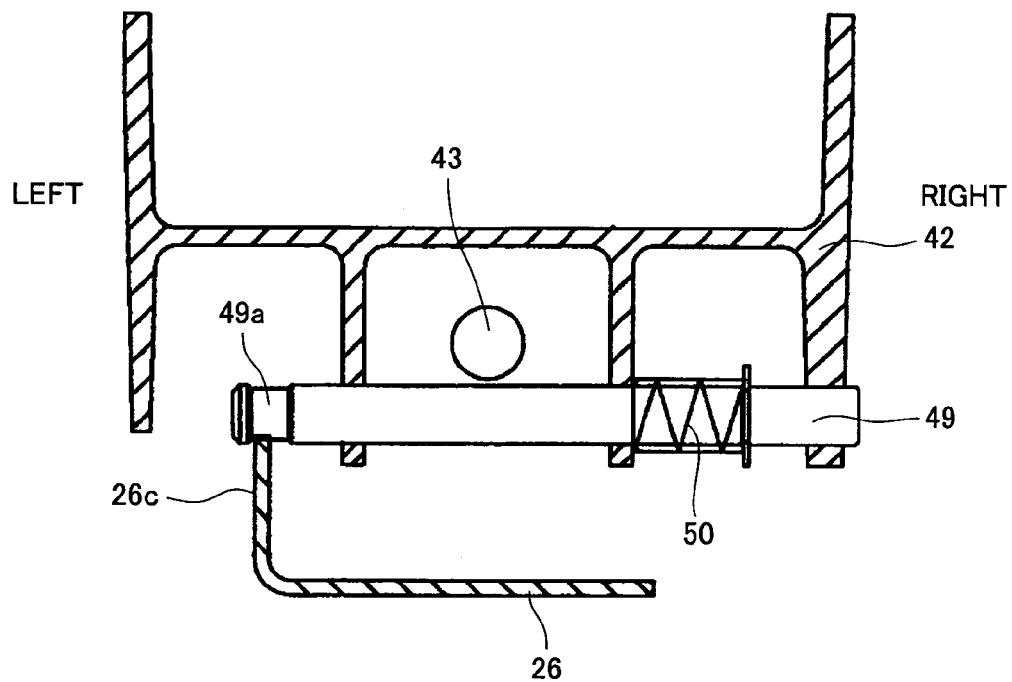
FIG. 25 is a cross-sectional view taken along the line XXIV-XXIV of FIG. 9.

As shown in FIGS. 9 and 10, the adjustment unit 41 includes a front frame 42 with which a lock lever fixing pin 49 is laterally slidably supported for avoiding engagement of the upward protrusion 26B with the one of the locking grooves 16a. As shown in FIG. 25 the lock lever fixing pin 49 has a tip end portion formed with an annular fixing groove 49a. Further, a spring 50 is disposed over the lock lever fixing pin 49 for urging the pin 49 rightward. A tongue 260 extends upwardly from a left side of the lock lever 26. The fee end of the tongue 260 is positioned in superposed relation to the slide locus of the lock lever fixing pin 49. Normally, the lock lever fixing pin 49 is biased rightward by the biasing force of the spring 50. In this case, the tongue 26C is out of engagement from the annular fixing groove 49a, so that the upward protrusion 26B is engageable with one of the locking grooves 16a. On the other hand, if the push-down portion 26A of the lock lever 26 is pushed down and the lock lever fixing pin 49 is pushed leftward in FIG. 25, the tongue 26 can be engaged with the annular fixing groove 49a when the push-down portion 26A is released. As a result, the engagement of the upward protrusion 26B with the one of the locking grooves 16a is prevented to allow the turntable 21 to be freely angularly rotated to a desired angle.

As shown in FIGS. 8 through 10, the adjustment unit 41 further includes a fixing handle 43, an adjusting screw 44 and a table contact piece 45 in addition to the lock lever fixing pin 49. The front frame 42 of the turntable 21 has a front wall 47 (FIG. 9) and a rear wall 48 (FIG. 9) and is formed with a front opening 42a, and lateral holes. The fixing handle 43 has a shaft portion 43A extending through the front opening 42a in frontward/rearward direction, and has an inner distal end pressure contactable with the outer peripheral surface of the arcuate portion 16 of the base 11. The adjusting screw 44 extends through the lateral holes in a direction perpendicular to the shaft portion 43A. The adjusting screw 44 includes a shaft portion 44A and a pair of knobs 44B at both ends of the shaft portion 44A. The shaft portion 43A is formed with a male thread at a region crossing with the adjusting screw 44. The adjusting screw 44 is also formed with a male thread at a region crossing with the shaft portion 43A.

The table contact piece 45 is movable between the front wall 45 and the rear wall 48 and is selectively contactable with the front wall 45 in accordance with the frontward movement of the table contact piece 45 or with the rear wall 48 in accordance with a rearward movement thereof. The table contact piece 45 is formed with a first female thread 45*a* threadingly engageable with the male thread of the shaft portion 43A, and a second female thread 45*b* threadingly engageable with the male thread of the adjusting screw 44. The first and second female thread 45*a* and 45*b* extend perpendicular to each other, and are not intersected with each other but are offset from each other in the vertical direction. Thus, the fixing handle 43 and the adjusting screw 44 are directed perpendicular to each other by way of the table contact piece 45. The fixing handle 43 and the table contact piece 45 constitute engagement components.

As shown in FIGS. 9 and 10, springs 46 are juxtaposed laterally and are interposed between the table contact piece 45 and the front wall 47 for permitting the piece 45 to abut on the rear wall 48. By threadingly advancing the fixing handle 43, the shaft portion 43A is moved rearward relative to the piece 45. However, after the distal inner end of the shaft portion 43A abuts on the outer peripheral surface of the arcuate portion 16, the fixing handle 43 cannot any more. Instead, the piece 45 is then moved frontward because of the threading engagement with the shaft portion 43A.

Each end of the adjusting screw 44 is provided with the knob 44B interposing the front frame 42 therebetween. Therefore, the adjusting screw 44 is not movable laterally, i.e., in its axial direction relative to the front frame 42. By the rotation of the adjusting screw 44 about its axis, relative movement between the piece 45 and the shaft portion 44A occurs. In this case, since the shaft portion 44A is immovable in its axial direction, the piece 45 is moved laterally within the front frame 42. The angular rotational position of the turntable 21 is fixed at a predetermined position by the engagement of the upward protrusion 26B with one of the locking grooves 16*a*. However, the engagement between the upward protrusion 26B and the locking groove 16*a* is prevented at positions nearby the particular locking grooves which define angular rotation angle such as 0 degree, and 15 degrees in order to perform fine angular position control of the turntable 21 nearby these angles.

When the tip end of the shaft portion 43A is brought into tight contact with the outer peripheral surface of the arcuate portion 16*a* of the base 11, the fixing handle 43 is considered to be integral with the base 11. Therefore, the lateral movement of the table contact piece 45 relative to the front frame 42 implies the lateral movement of the front frame 42 relative to the base 11, i.e., a minute lateral angular movement of the turntable 21 relative to the base 11.

Figure 12:
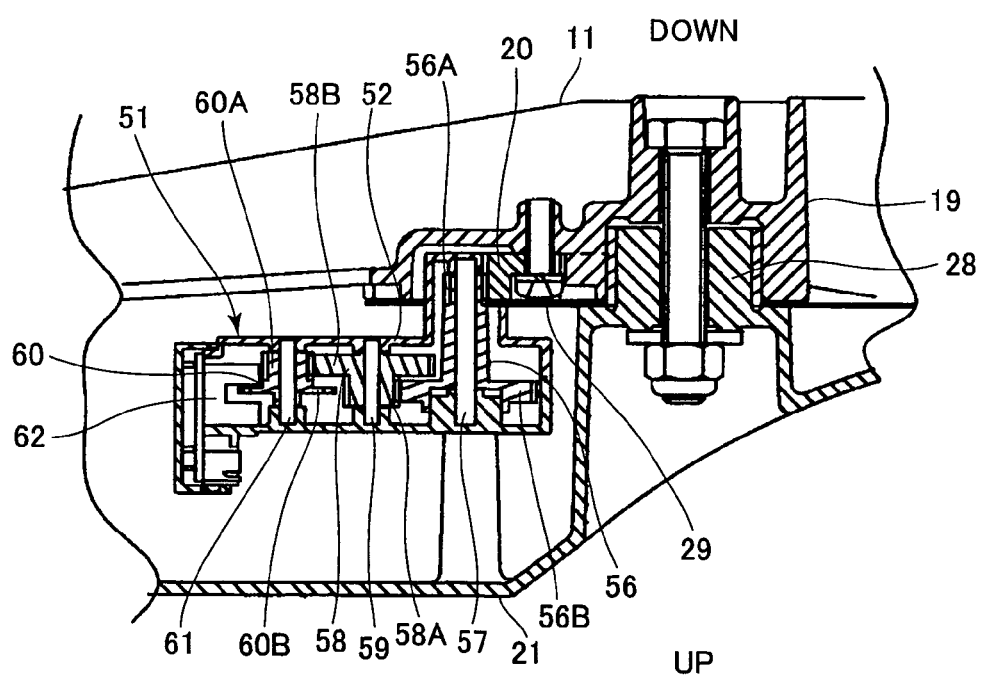
FIG. 12 is a cross-sectional view showing a supporting arrangement for supporting rotation of the turntable at a base in the miter saw according to the first embodiment.
Figure 13:
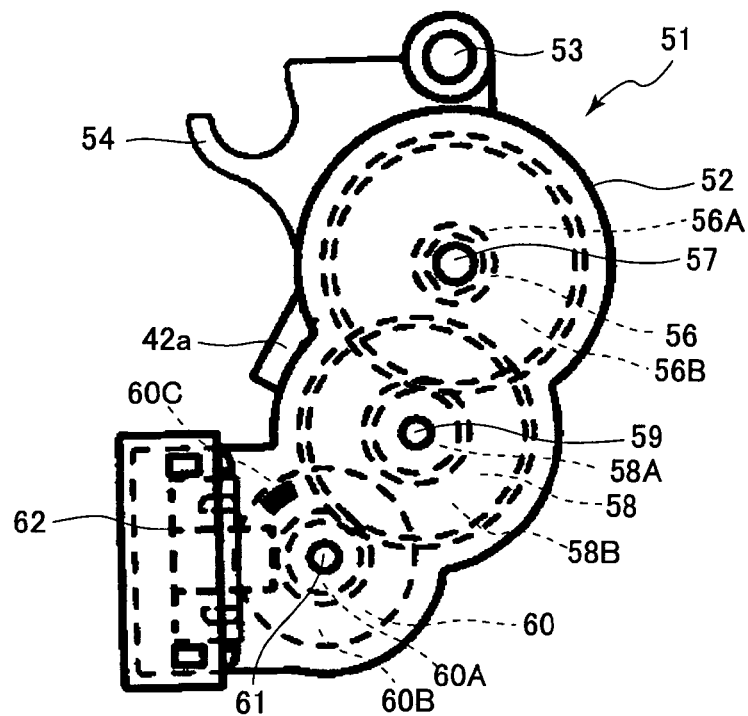
FIG. 13 is a plan view showing a rotation amount detection unit in the miter saw according to the first embodiment.

As shown in FIGS. 12 and 13, the rotation amount detection unit 51 includes a sealed housing 52 supported to the turntable 21. In the housing 52, an amplifier including a first gear set 56 and a second gear set 58, a detected segment 60 and an optical sensor 62 are assembled. Shafts 57, 59 and 61 are disposed in and rotatably supported to the housing 52. The first gear set 56 includes a first gear 56A and a second gear 56B. The first gear 56A protrudes outwardly from the housing 52 and is meshedly engaged with the outer gear teeth segment 20. The second gear 56B is coaxially with and integral with the first gear 56A and is meshedly engaged with the second gear set 58. A diameter of the second gear 56B is greater than that of the first gear 56A. The first and second gears 56A and 56B are rotatable about the shaft 57, and the second gear 56B and a major part of the first gear 56A are disposed in the housing 52.

The second gear set 58 includes a third gear 58A and a fourth gear 58B. The third gear 58A is meshedly engaged with the second gear 56B. The fourth gear 58B is coaxially with and integral with the third gear 58A and is meshedly engaged with the detected segment 60. A diameter of the fourth gear 58B is greater than that of the third gear 58A. The third and fourth gears 58A and 58B are rotatable about the shaft 59 and are disposed in the housing 52.

The detected segment 60 includes a fifth gear 60A meshedly engaged with the fourth gear 58B, and a disc like detected element 60B coaxially with and integral with the fifth gear 60A. The detected segment 60 is rotatable about the shaft 61 and is disposed in the housing 52. The disc like detected element 60B is formed with a hundred of radial slits 60C. The optical sensor 62 has a pair of arms for supporting the disc like detected element 60B therebetween. Slits 60C is detected at the arms for detecting rotation angle of the disc like detected element 60B.

The optical sensor 62 includes two light emitting elements (not shown) and two light receiving elements (not shown) each positioned in confronting relation to each light emitting element. The disc like detected element 60B is positioned between the light emitting elements and the light receiving elements. In accordance with the rotation of the disc like detected element 60B, lights emitted from the two light emitting elements pass through the respective slits 60C and reach the light receiving elements, and are shut off by a solid region of the disc like detected element 60B alternately, the solid region being positioned between the neighboring slits 60C and 60C to generate optical pulses.

One of the pair of light emitting and receiving elements are angularly displaced from the remaining pair of light emitting and receiving elements in the circumferential direction of the disc like detected element 60B. The microcomputer 142 receives two pulse trains A and B displaced from each other by 90 degrees as shown in FIG. 46 corresponding to the angular displacement.

Since the two pulse trains A and B displaced from each other by 90 degrees are detected, rotating direction of the disc like detected element 60B can be detected. In other words, the direction of the angular rotation of the turntable 21 can be detected, the direction being one of the clockwise direction and counterclockwise direction.

Figure 46:
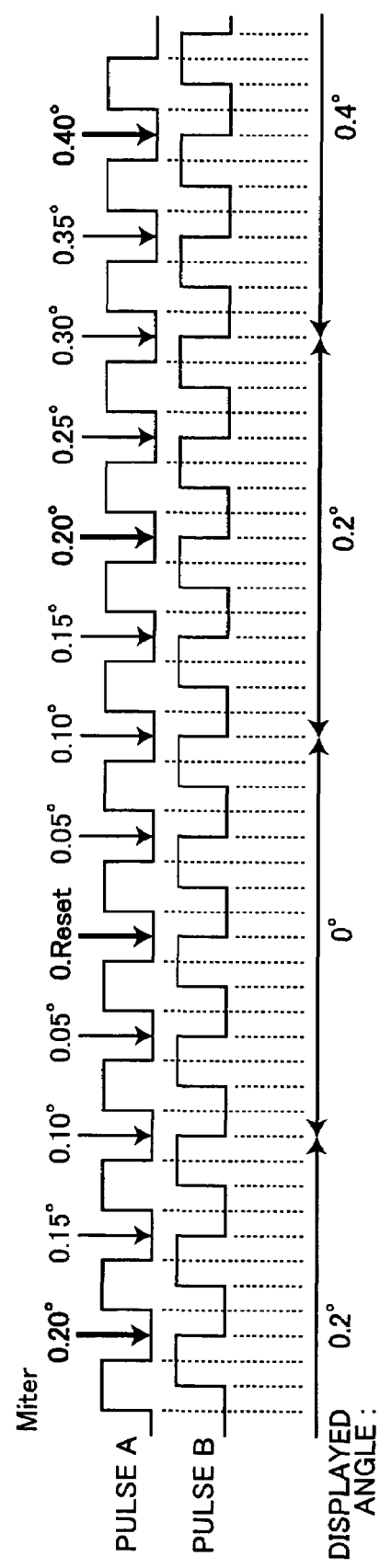
FIG. 46 is a block diagram showing two pulse trains generated in the rotation amount detection unit according to the first embodiment.

More specifically, regarding pulse trains A and B in FIG. 46, high level and low level are designated by "1" and "0", respectively. Assuming that the present pulse in the pulse train A is "0", and the present pulse in the pulse train B is "0". Then, if the pulse in the pulse train A is "1", whereas the pulse in the pulse train B is "0", the angular rotating direction of the turntable 21 is assumed to be clockwise direction, i.e., rightward in FIG. 46. On the other hand, assuming that the present pulse in the pulse train A is "0", and the present pulse in the pulse train B is "0", and if the pulse in the pulse train A is "0", whereas the pulse in the pulse train B is "1", the angular rotating direction of the turntable 21 is assumed to be counterclockwise direction, i.e., leftward in FIG. 46. Incidentally, the gear ratio of the rotation amount detection unit 51 is set so as to provide rotation of the detected segment 60 by 72 degrees per every rotation of the turntable 21 by 1 degree.

Figure 14:
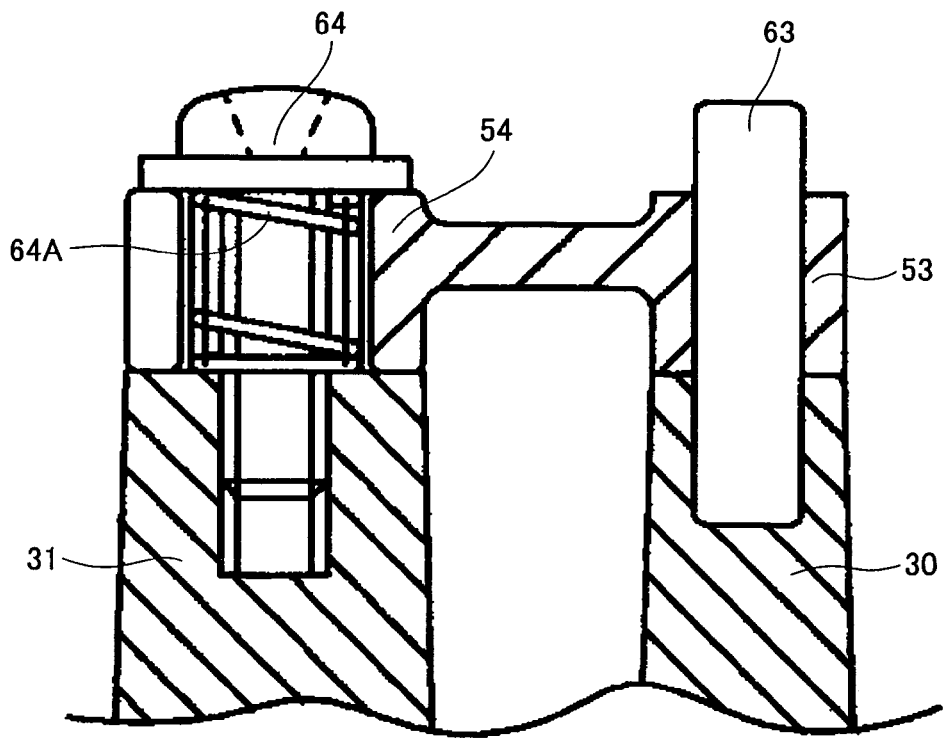
FIG. 14 is an enlarged cross-sectional view showing a pin and a screw for the rotation amount detection unit in the miter saw according to the first embodiment.

As shown in FIG. 13, in the rotation amount detection unit 51, a pin extension hole 53 and a screw fixing region 54 are formed at the housing 52 in the vicinity of the first gear set 56. A pin 63 extends through the pin extension hole 53. The screw fixing region 54 has a C-shape configuration having an open end part. As shown in FIG. 14, when a screw 64 is attached to the screw fixing portion 31, the screw fixing region 54 can be separated from the screw 64 as long as the screw 64 is unfastened. The open end part of the screw fixing region 54 allows the rotation amount detection unit 51 to be pivotally moved while the unfastened screw 64 extends into the screw fixing portion 1. Thus, the rotation amount detection unit 51 is pivotable with respect to the turntable 21 about a pin 63. Further, the pivot position of the rotation amount detection unit 51 can be fixed relative to the turntable 21 at a desired angle by fastening the screw 64. Incidentally, a spring 64A is interposed between the screw 64 and the screw fixing portion 31 so that the spring 64A functions as a spring washer. Thus, reaction force is always imparted on the screw 64 in its axial direction, which prevents the screw 64 from being freely rotated about is axis. Consequently, accidental release of the screw 64 from the screw fixing portion 31 due to vibration can be prevented even if the screw 64 is unfastened.

Figure 11:
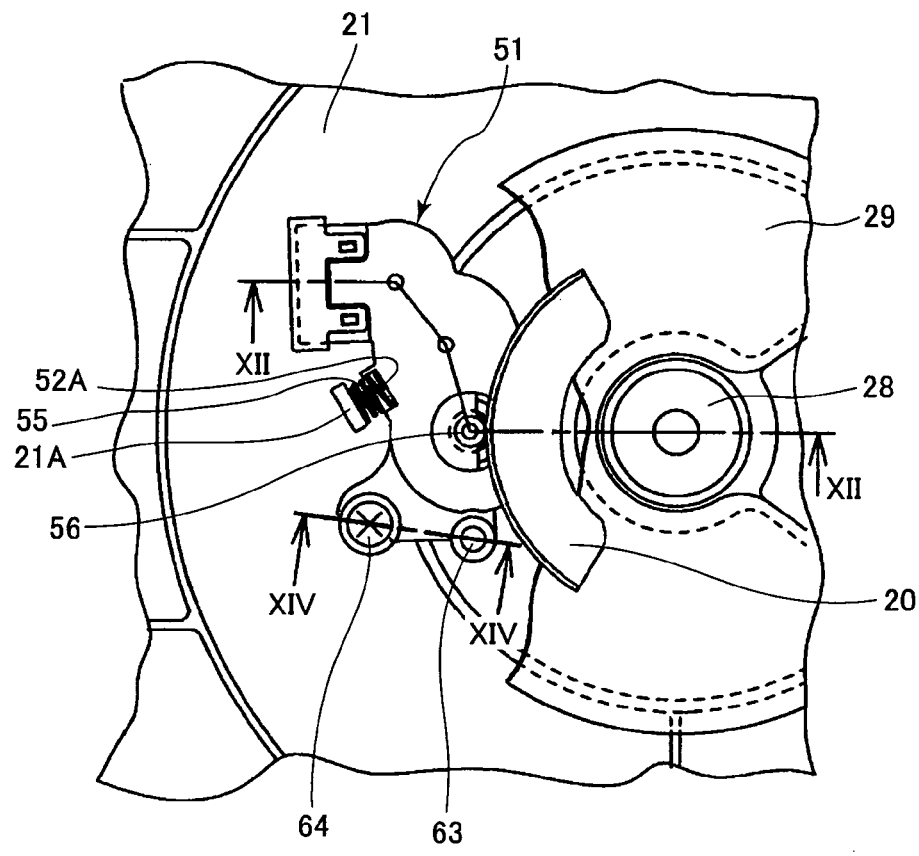
FIG. 11 is a view showing a lower face of the turntable in the miter saw according to the first embodiment.

As shown in FIG. 11, the housing 52 has an abutment region 52A, and the turntable 21 has an abutment plate 21A protruding downward from the lower face of the turntable 21 and in confrontation with the abutment region 52A. A spring 55 is interposed between the abutment plate 21A and the abutment region 52A when the rotation amount detection unit 51 is attached to the turntable 21. By the biasing force of the spring 55, the first gear 56A of the first gear set 56 is pressed against the outer gear teeth segment 20. Accordingly, rattling of the first gear 56A relative to the outer gear teeth segment 20 can be restrained, and consequently, angular rotation of the turntable 21 relative to the base 11 can be accurately detected.

As shown in FIGS. 6 and 7, the turntable 21 has a rear end provided with a tilting motion support 71. The support section 3 includes a tilt section 74 tiltable relative to the tilting motion support 71.

Figure 15:
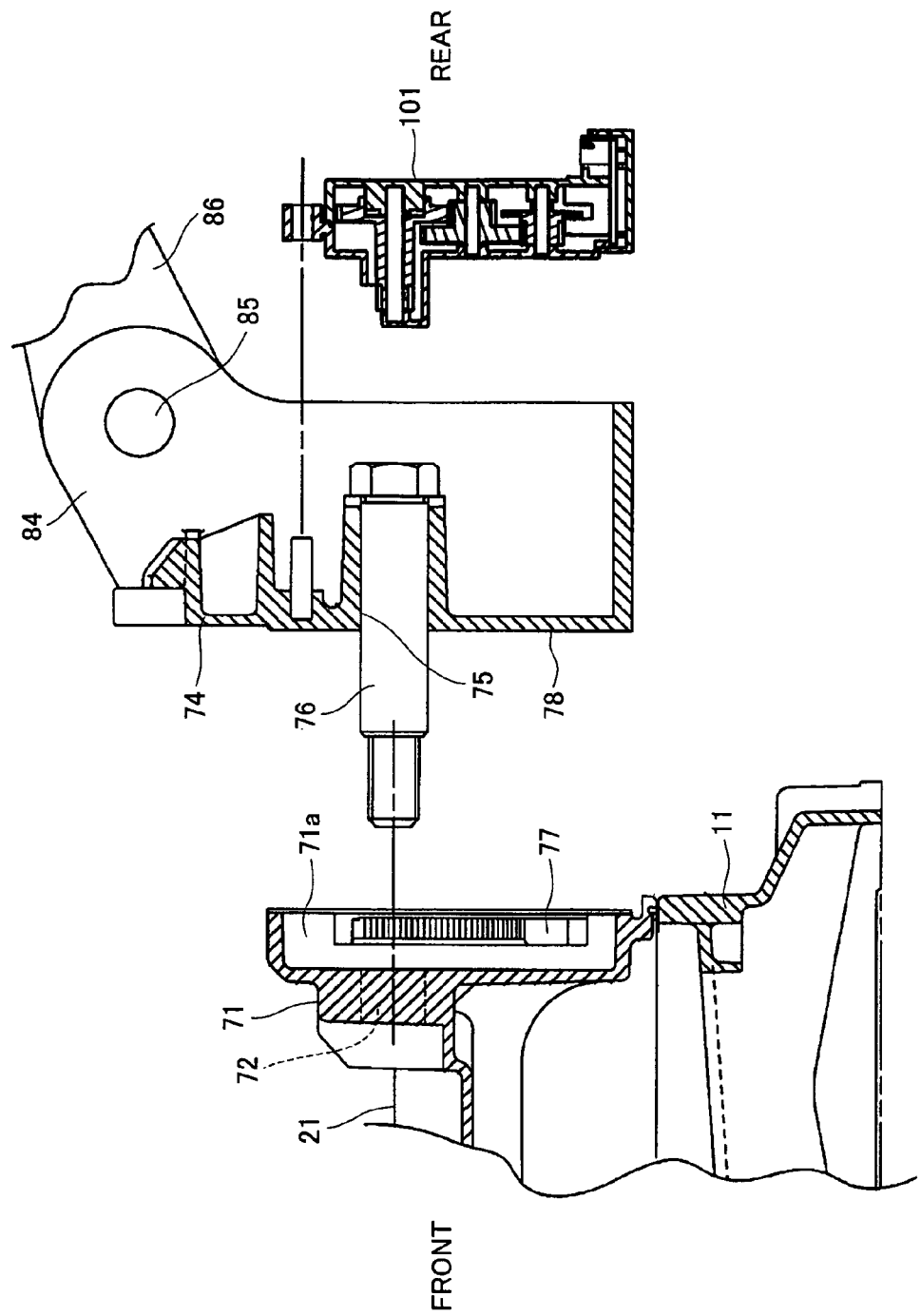
FIG. 15 is an exploded cross-sectional view showing the positional relationship between a tilt motion support and a tilt section in the miter saw according to the first embodiment.

As shown in FIG. 6, the tilting motion support 71 extends upward from the rearmost end of the turntable 21. As shown in FIG. 15, The tilting motion support 71 is formed with a support bore 72 positioned flush with the upper surface of the turntable 21 and coaxially with the widthwise centerline of the slit 25a (FIG. 1). The tilt section 74 has a pin bolt 76 inserted into the support bore 72, so that the tilt section 74 is linked to the tilting motion support 71. The tilting motion support 71 has a wall in contact with the tilt section 74, and the wall is formed with a circular recess 71a. An arcuate inner gear teeth 77 is fixed to the circular recess 71a by a screw (not shown). The arcuate inner gear teeth 77 is on an imaginary circle whose center is coincident with a center axis of the support bore 72.

Figure 18:
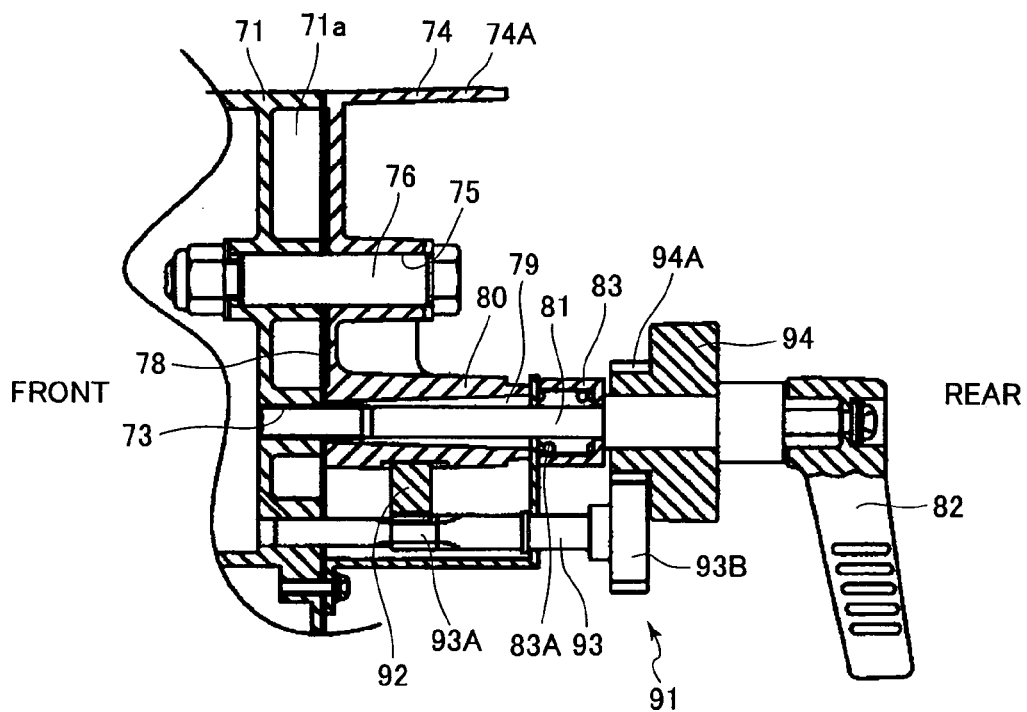
FIG. 18 is a cross-sectional view taken along the line XVIII-XVIII of FIG. 17.

As shown in FIG. 18, a slide wall 78 is provided at the tilt section 74 and at a position in sliding contact with the tilting motion support 71. A pivot hole 75 is formed at an approximately center of the slide wall 78, and the pin bolt 76 extends through the pivot hole 75. Thus, the slide wall 78 is in sliding contact with a contour edge of the circular recess 71a at the rear side of the tilting motion support 71 when the tilt section 74 is pivotally moved relative to the tilting motion support 71. A rear wall 74A extends rearward from an edge of the slide wall 78. That is, the rear wall 74A extends substantially in parallel with the pin bolt 76, and in a direction from the tilting motion support 71 to the tilt section 74.

Figure 16:
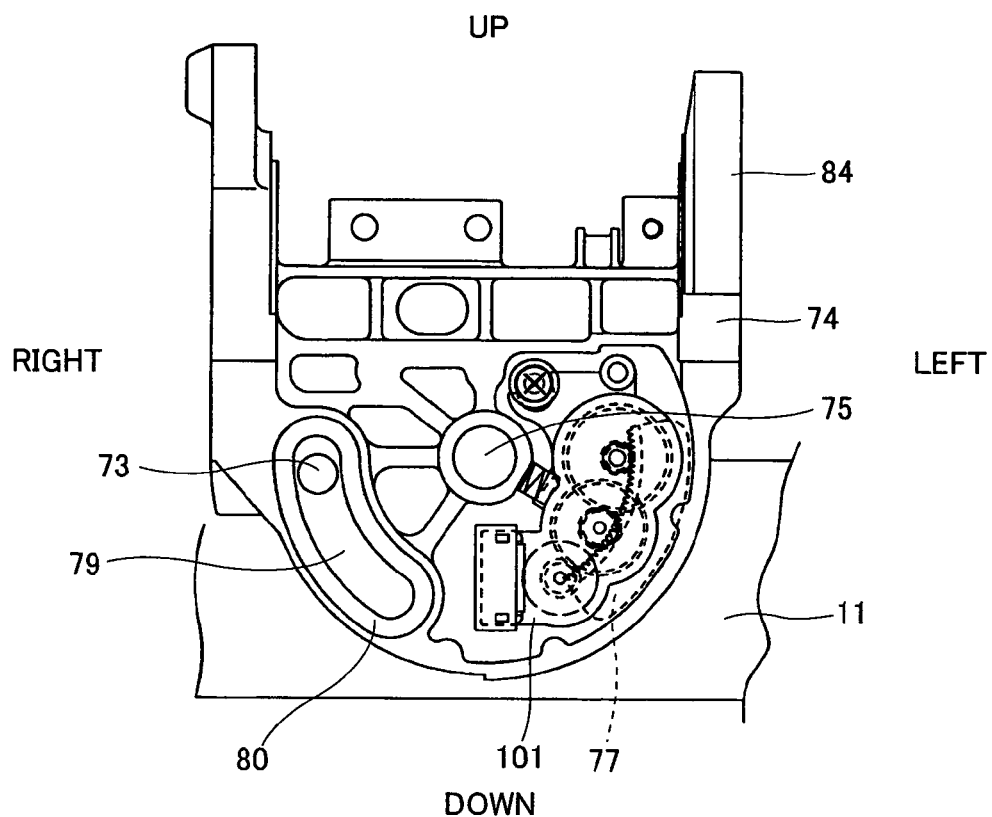
FIG. 16 is a rear view showing the tilt section and a rotation amount detection unit in the miter saw according to the first embodiment.

As shown in FIG. 16, an arcuate elongated slot 79 whose contour is defined by an arcuate rib 80 is formed in the tilt section 74 and at a position rightward of the pivot hole 75 of the tilt section 74. The elongated slot 79 is open at the surface of the slide wall 78, and is located on an imaginary circle whose center is coincident with the center axis of the pivot hole 75. The tilting motion support 71 is formed with a clamp hole 73 threadingly engageable with a clamp shaft 81 (described later). The clamp hole 73 is positioned in confronting relation to the elongated slot 79.

A tilting amount detection unit 101 is disposed leftward of the pivot hole 75 and at a position surrounded by the slide wall 78 and the rear wall 74A. The tilting amount detection unit 101 is adapted for detecting a tilting amount of the tilt section 74 relative to the tilting motion support 71 in association with the arcuate inner gear teeth 77 provided therein.

A pair of tilt support arms 84 extend upward from the tilt section 74 at a position above the pivot hole 75 for supporting the circular saw unit 4. A tilt support pin 85 (FIG. 15) extends between the pair of tilt support arms 84,84 for connecting the circular saw unit 4 to the support section 3. A cover 87 (FIG. 2) is provided at the end of the rear wall 74A for protecting the elongated slot rib 80, the tilting amount detection unit 101, and the pin bolt 76. Therefore, these components 80, 101 and 76 are not exposed to the atmosphere. An arm support 86 (FIG. 1) is provided at the left tilt support arm 84 for supporting an arm 127 (described later, FIG. 1).

As shown in FIG. 18, the clamp shaft 81 has a tip end formed with a male thread for threadingly engaging with the clamp hole 73. Thus, a tiltable range of the tilt section 74 relative to the tilting motion support 71 is defined by a movable range of the clamp shaft 81 within the elongated slot 79. In the depicted embodiment, the tiltable range is 45 degrees.

As shown in FIG. 18, the arcuate rib 80 defining the elongated slot 79 extends rearward from the rear surface of the tilt section 74. A clamp lever 82 is provided at a rear end of the clamp shaft 81. A spacer 83 assembling therein a spring 83A is interposed between the clamp lever 82 and the rear end face of the arcuate rib 80. Since the clamp shaft 81 is threadingly engaged with the clamp hole 73 of the tilting motion support 71, the clamp lever 82 and the spacer 83 are moved toward the tilting motion support 71 upon fastening the clamp shaft 81 in response to the pivotal motion of the clamp lever 82 about an axis of the clamp shaft 81. Since the arcuate rib 80 which is a part of the tilt section 74 exists between the spacer 83 and the tilting motion support 71, the arcuate rib 80 is nippingly interposed between the spacer 83 and the tilting motion support 71. Accordingly, a frictional force is generated between the slide wall 78 and the tilting motion support 71 so that the tilt section 74 is fixed to the tilt motion support 71 at a desired tilting posture. Thus, a clamp unit is constituted by the clamp shaft 81, the clamp lever 82, the spacer 83 and the spring 83A. Because of the provision of the spring 83A within the spacer 83, the clamp lever 82 is urged rearward relative to the tilting motion support 71 and the arcuate rib 80. Consequently, accidental pivotal motion of the clamp lever 82 can be restrained to reduce rattling.

Figure 17:
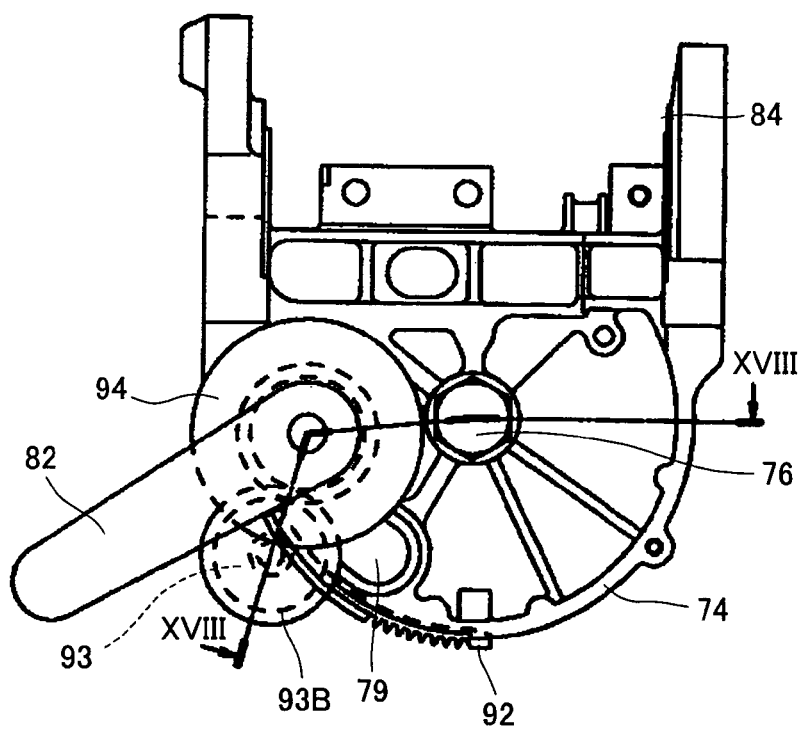
FIG. 17 is a view for description of the tilt section and an adjustment mechanism for finely adjusting the tilting angle of the tilt section in the miter saw according to the first embodiment.

As shown in FIGS. 17 and 18, a tilt amount fine control unit 91 is disposed nearby the clamp shaft 81 for finely controlling tilting amount of the tilt section 74 relative to the tilt motion support 71. The tilt amount fine control unit 91 includes an arcuate gear teeth 92 fixed to the tilt section 74, a rotation shaft 93 meshedly engaged with the arcuate gear teeth 92, and an adjustment knob 94 meshedly engaged with the rotation shaft 93. The arcuate gear teeth 92 is located on an imaginary circle whose center is coincident with the center axis of the pivot hole 75. Further, the arcuate gear teeth 92 is fixed at a position along a radially outer edge of the elongated slot 79 (FIG. 17). The rotation shaft 93 is rotatably supported to the tilting motion support 71 and extends rearward in a direction approximately parallel with the clamp shaft 81. The rotation shaft 93 includes a first gear 93A meshedly engaged with the arcuate gear teeth 92. The rotation shaft 93 also includes a second gear 93B having a diameter greater than that of the first gear 93A and provided at a rear end of the rotation shaft 93. The adjustment knob 94 is coaxially with and rotatably disposed over the clamp shaft 81. The coaxial arrangement of the adjustment knob 94 with the clamp shaft 81 can save a space, thereby improving implementation or packaging of the tilt amount fine control unit 91.

Since the arcuate gear teeth 92 and the rotation shaft 93 are drivingly connected to each other, and since the rotation shaft 93 is connected to the adjustment knob 94, the adjustment knob 94 is connected to the circular saw unit 4 through the rotation shaft 93. Further, the clamp lever 82 and the adjustment knob 94 provide a relationship that allows an operator to operate the clamp lever 82 at his one hand and to operate the adjustment knob 94 at his another hand. Therefore, for unclamping the tilting position of the tilt section 74, operator's one hand can operate the clamp lever 82 while operator's another hand can operate the adjustment knob 94. Accordingly, it is possible to prevent the circular saw unit 4 from its excessive tilting motion due to its own weight upon unclamping. Further, it is possible to start fine adjustment to the tilting posture of the tilt section 74 immediately after the unclamping.

A third gear 94A meshedly engaged with the second gear 93B is provided integrally and coaxially with the adjustment knob 94 at a position in front of the adjustment knob 94. Incidentally, since the arcuate gear teeth 92 is drivingly connected to the adjustment knob 94, the adjustment knob 94 continues rotating as long as the tilt section 74 is tiltingly moved for tilting the circular saw unit 4.

Further, since the gear ratio between the third gear 94A and the second gear 93B and between the first gear 93A and the arcuate gear teeth 92 is desirably set, a small tilting angle of the circular saw unit 4 results even if the adjustment knob 94 is rotated at a large rotation angle. This facilitates the fine tilting angle control.

Figure 19:
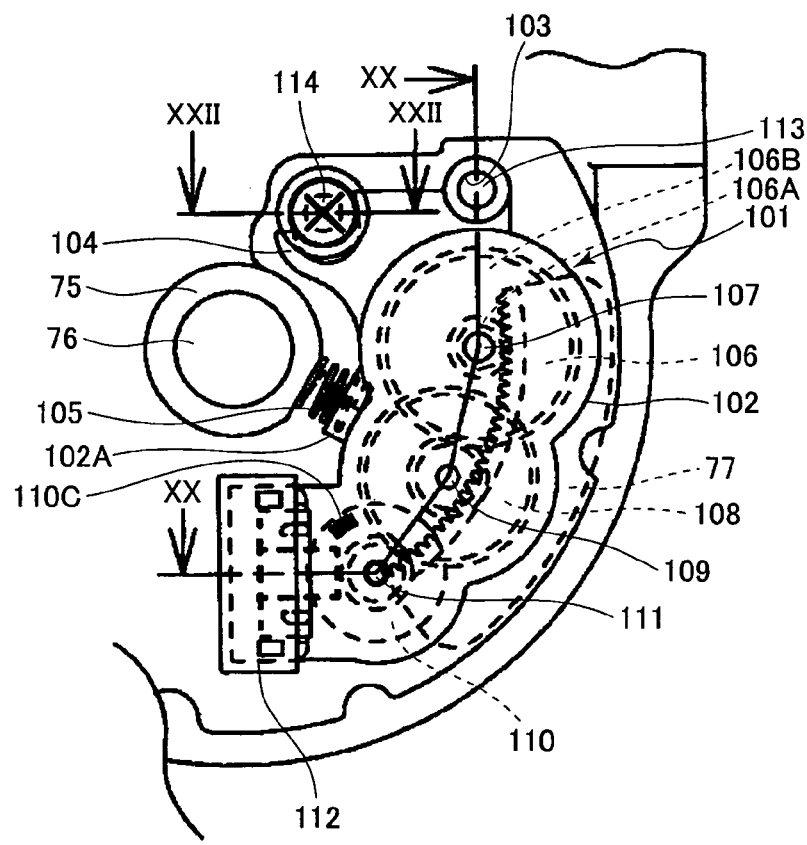
FIG. 19 is a view showing a tilting amount detection unit in the miter saw according to the first embodiment.
Figure 20:
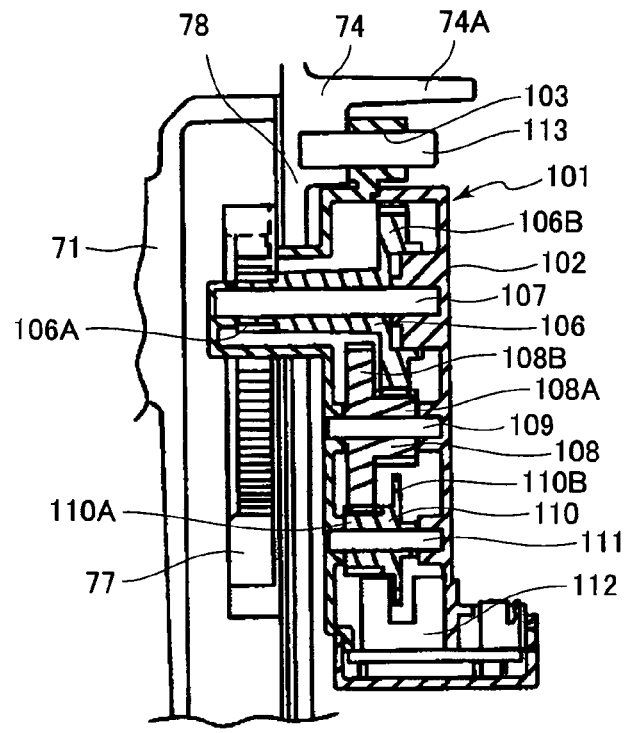
FIG. 20 is a cross-sectional view taken along the line XX-XX of FIG. 19.

As shown in FIGS. 19 and 20, the tilting amount detection unit 101 includes a sealed housing 102, an amplifier containing a first gear set 106 and a second gear set 108, a detected segment 110 and an optical sensor 112, those assembled in the housing 102. Shafts 107, 109 and 111 are disposed in and rotatably supported to the housing 102. The first gear set 106 is supported to the shaft 107 and includes a first gear 106A and a second gear 106B. The first gear 106A protrudes outwardly from the housing 102, and the protruding part extends through a bore (not shown) formed in the tilt section 74, and is meshedly engaged with the arcuate inner gear teeth 77. The second gear I 06B is coaxially with and integral with the first gear 106A and is meshedly engaged with the second gear set 108. A diameter of the second gear 106B is greater than that of the first gear 106A. The first and second gears 106A and 106B are rotatable about an axis of the shaft 107, and the second gear 106B and a major part of the first gear 106A are disposed in the housing 102.

The second gear set 108 includes a third gear 108A and a fourth gear 108B. The third gear 108A is meshedly engaged with the second gear 106B. The fourth gear 108B is coaxially with and integral with the third gear 108A and is meshedly engaged with the detected segment 110. A diameter of the fourth gear 108B is greater than that of the third gear 108A. The third and fourth gears 108A and 108B are rotatable about an axis of the shaft 109 and are disposed in the housing 102.

The detected segment 110 includes a fifth gear 110A meshedly engaged with the fourth gear 108B, and a disc like detected element 110B coaxially with and integral with the fifth gear 110A. The detected segment 110 is rotatable about an axis of the shaft 111 and is disposed in the housing 102. The disc like detected element 110B is formed with a hundred of radial slits 110C. The optical sensor 112 has a pair of arms for supporting the disc like detected element 110B therebetween. Slits 110C is detected at the arms for detecting rotation angle of the disc like detected element 110B.

The optical sensor 112 includes two light emitting elements (not shown) and two light receiving elements (not shown) each positioned in confronting relation to each light emitting element. The disc like detected element 110B is positioned between the light emitting elements and the light receiving elements. In accordance with the rotation of the disc like detected element 110B, lights emitted from the two light emitting elements pass through the respective slits 110C and reach the light receiving elements, and are shut off by a solid region of the disc like detected element 110B alternately, the solid region being positioned between the neighboring slits 110C and 110C to generate optical pulses.

One of the pair of light emitting and receiving elements are angularly displaced from the remaining pair of light emitting and receiving elements in the circumferential direction of the disc like detected element 110B. The microcomputer 142 receives two pulse trains A and B displaced from each other by 90 degrees as shown in FIG. 47 corresponding to the angular displacement.

Since the two pulse trains A and B displaced from each other by 90 degrees are detected, rotating direction of the disc like detected element 110B can be detected. In other words, the tilting direction of the circular saw unit 4 can be detected, the direction being one of the clockwise direction and counterclockwise direction.

Figure 47:
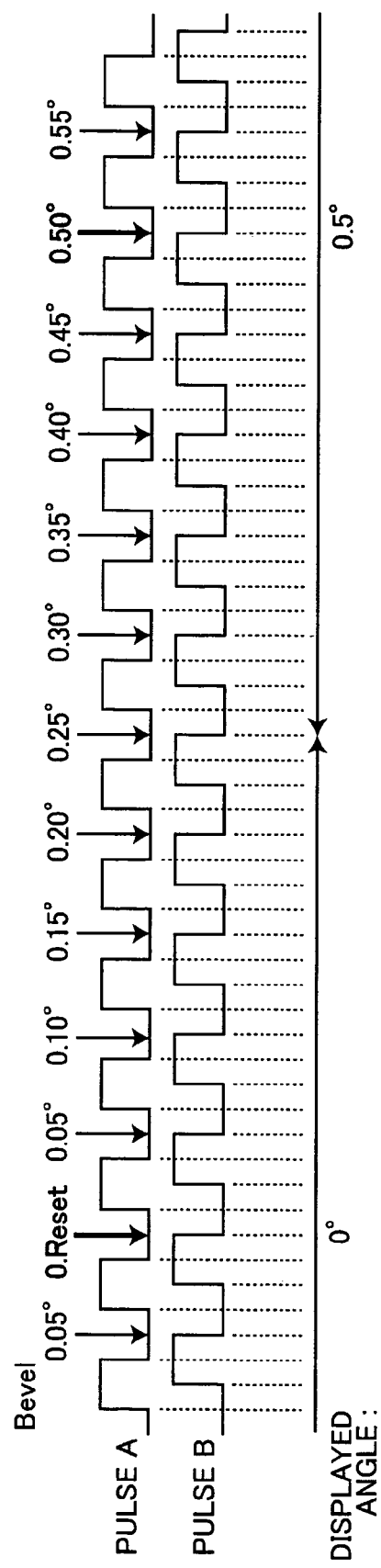
FIG. 47 is a block diagram showing two pulse trains generated in the tilting amount detection unit according to the first embodiment.

More specifically, regarding pulse trains A and B in FIG. 47, high level and low level are designated by "1" and "0", respectively. Assuming that the present pulse in the pulse train A is "0", and the present pulse in the pulse train B is "0". Then, if the pulse in the pulse train A is "1", whereas the pulse in the pulse train B is "0", the tilting direction of the tilt section 74 is assumed to be clockwise direction, i.e., leftward in FIG. 47. On the other hand, assuming that the present pulse in the pulse train A is "0", and the present pulse in the pulse train B is "0", and then if the pulse in the pulse train A is "0", whereas the pulse in the pulse train B is "1", the tilting direction of the circular saw unit 4 is assumed to be counterclockwise direction, i.e., rightward in FIG. 47. Incidentally, the gear ratio of the tilting amount detection unit 101 is set so as to provide rotation of the detected segment 110B by 72 degrees per every tilting angle of the tilt section 74 by 1 degree.

Figure 22:
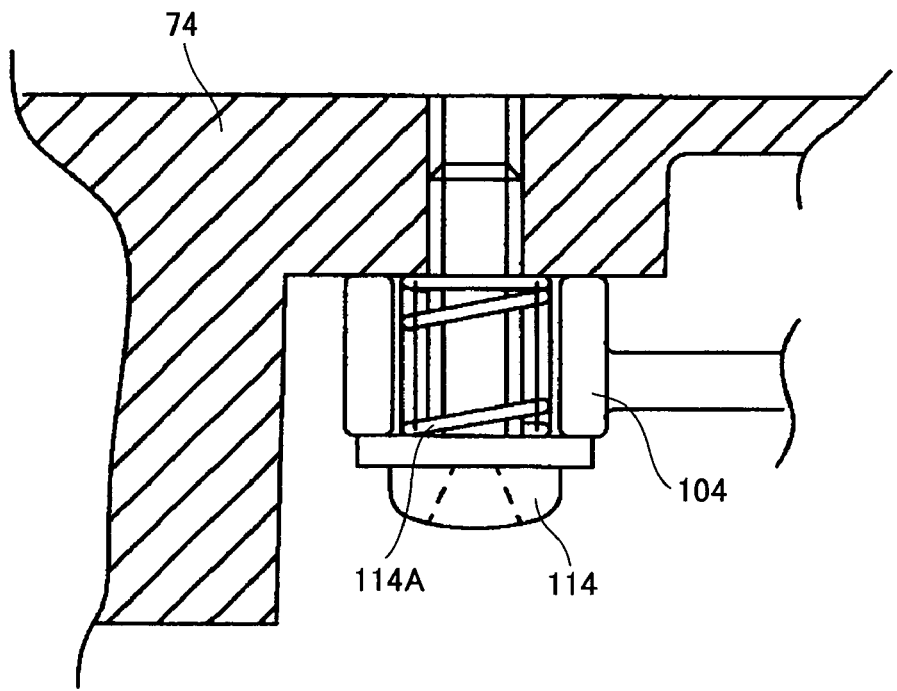
FIG. 22 is a cross-sectional view taken along the line XXII-XXII of FIG. 19.

As shown in FIG. 19, in the tilting amount detection unit 101, a pin extension hole 103 and a screw fixing region 104 are formed at the housing 102 in the vicinity of the first gear set 106. A pin 113 extends through the pin extension hole 103. The screw fixing region 104 has a C-shape configuration having an open end part. As shown in FIG. 22, when a screw 114 is attached to the screw fixing portion 104, the screw fixing region 104 can be separated from the screw 114 as long as the screw 114 is unfastened. The open end part of the screw fixing region 104 allows the tilting amount detection unit 101 to be pivotally moved while the unfastened screw 114 extends into the screw fixing portion 104. Thus, the tilting amount detection unit 101 is pivotable with respect to the tilt section 74 about a pin 113 within a range defined by the size of the screw fixing region 104. Further, the pivot position of the tilting amount detection unit 101 can be fixed relative to the tilt section 74 at a desired angle by fastening the screw 114. Incidentally, a spring 114A is interposed between the screw 114 and the tilt section 74 so that the spring 114A functions as a spring washer. Thus, reaction force is always imparted on the screw 114 in its axial direction, which prevents the screw 114 from being freely rotated about is axis. Consequently, accidental release of the screw 114 from the tilt section 74 due to vibration can be prevented even if the screw 114 is unfastened.

As shown in FIG. 19, the housing 102 has an abutment region 102A. A spring 105 is interposed between the abutment region 102A and an annular rib defining the pivot hole 75 when the pivot amount detection unit 101 is attached to the tilt section 74. By the biasing force of the spring 105, the first gear 106A of the first gear set 106 is pressed against the arcuate inner gear teeth 77. Accordingly, rattling of the first gear 106A relative to the arcuate inner gear teeth 77 can be restrained, and consequently, tilting amount (pivot amount) of the tilt section 74 relative to the tilting motion support 71 can be accurately detected.

Figure 21:
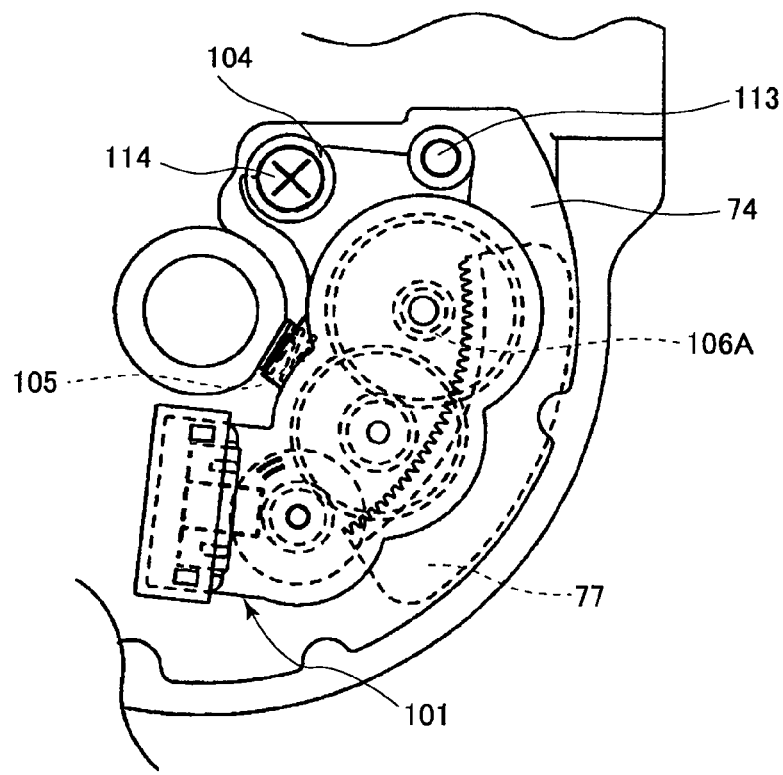
FIG. 21 is a view showing the tilting amount detection unit in the miter saw according to the first embodiment.

Attachment of the tilting amount detection unit 101 to the tilt section 74 may be difficult to achieve if the first gear 106A is biased to a position to be engageable with the arcuate inner gear teeth 77. For facilitating the attachment work, the tilting amount detection unit 101 is provisionally fixed, with the screw 114, to the tilt section 74 with a specific pivot posture where the spring 105 is compressed as shown in FIG. 21. This posture provides a sufficient space between the first gear 106A and the arcuate inner gear teeth 77. Then, the screw 114 is unfastened, so that the tilting amount detection unit 101 is pivotally moved toward the arcuate inner gear teeth 77 by the biasing force of the spring 105. Thus, the first gear 106A is brought into meshing engagement with the arcuate inner gear teeth 77.

The circular-saw unit 4 includes a frame 121, a motor housing 122, a handle 128, the circular saw blade 123, a saw cover 125 and a safety cover 126. The frame 121 is connected to the tilt support arm 84 through the tilt support pin 85. A spring (not shown) is interposed between the frame 121 and the tilt support arm 84 for biasing the frame 121 upwardly. Thus, the circular saw unit 4 is at its uppermost position as a rest position in case of a non-cutting operation.

The motor housing 122 is disposed at the front side of the frame 121 for accommodating a motor (not shown). The handle 128 is disposed at an outer peripheral surface and front side of the motor housing 122. A user grips the handle 128 to move the circular saw unit 4 downward for cutting operation. The motor housing 122 rotatably supports a rotation shaft 124 to which the circular saw blade 123 is concentrically fixed. The saw cover 125 is adapted to cover an upper half of the circular saw blade 123. The safety cover 126 is pivotally movably supported to the saw cover 125 and is protrudable from and retractable into the saw cover 125 for selectively covering a lower half of the circular saw blade 123. The arm 127 serves as a pivot moving mechanism for the safety cover 126, and has one end attached to the safety cover 126. The arm 127 has another end attached to the arm support 86. A carry handle 129 (FIG. 2) is provided at an approximately center portion of the frame 121 for hand-carrying the miter saw 1.

Figure 23:
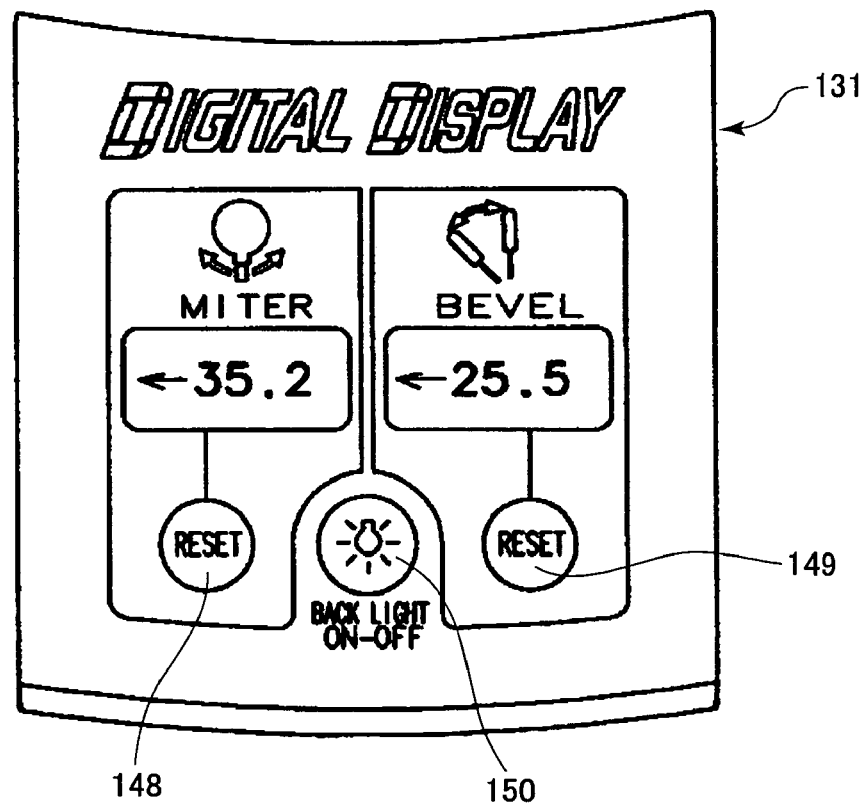
FIG. 23 is a plan view of a digital display in the miter saw according to the first embodiment.

As shown in FIG. 1, a digital display such as a liquid crystal display 131 is provided immediately above the adjustment unit 41. As shown in FIG. 23, the digital display 131 displays the angular rotation angle of the turntable 21 at a rate of 0.2 degrees, and displays the tilting angle of the circular saw unit 4 at a rate of 0.5 degrees. Therefore, even fine or minute angular rotation angle and the tilting angle can be accurately and easily recognized by the user. Generally, the user is positioned in front of the miter saw for cutting operation. Since the digital display 131 is provided at the front side of the miter saw 1, the user can easily recognize the displayed angle.

Figure 24:
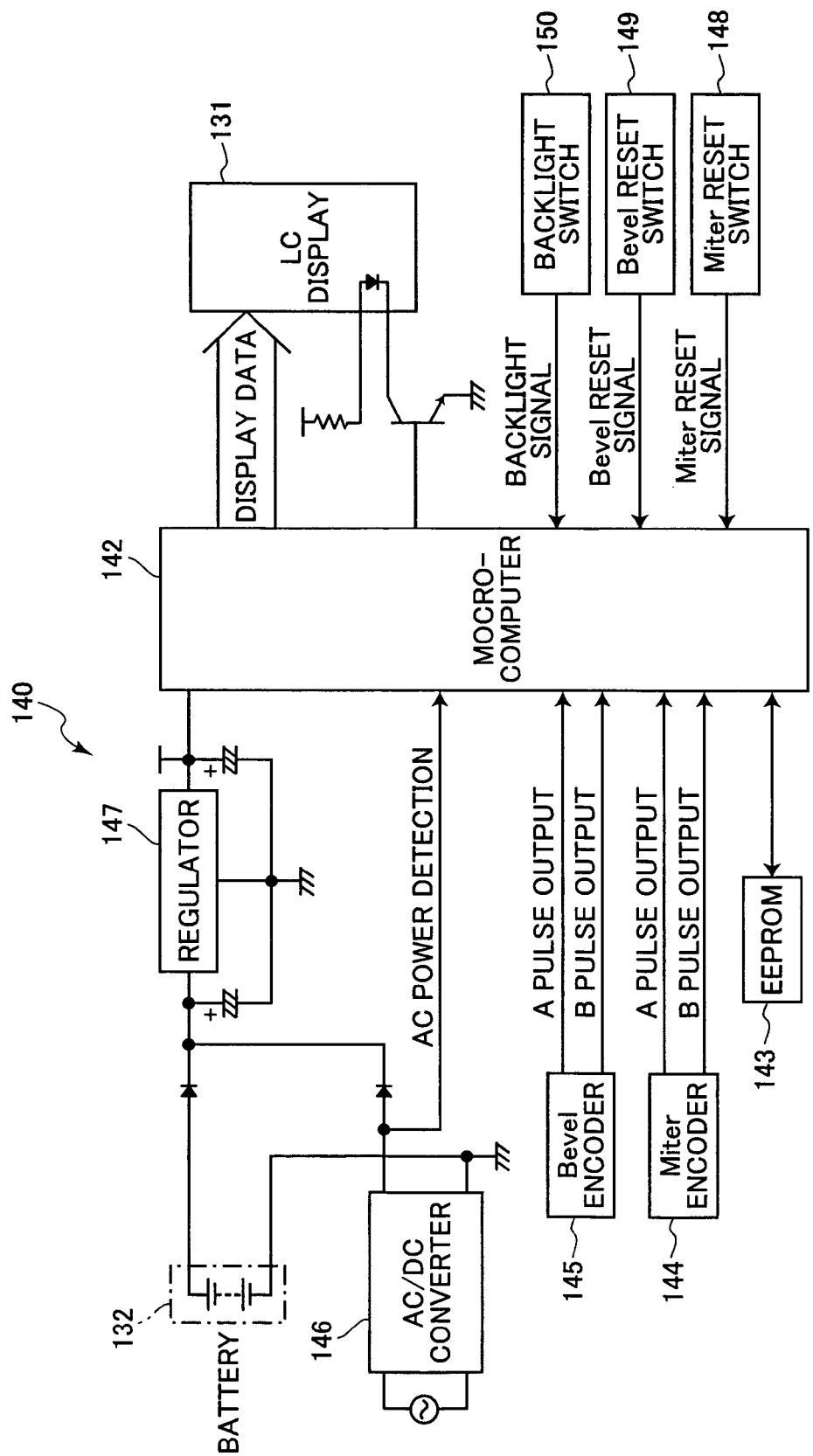
FIG. 24 is a control circuit in the miter saw according to the first embodiment.

The digital display 131 displays the angles based on output signals transmitted from the microcomputer 142. The microcomputer 142 includes a computing means that performs computation based on the detection made by the units 51 and 101. FIG. 24 shows a control circuit 140. To the microcomputer 142, are connected a EEPROM 143, a Miter encoder 144, a bevel encoder 145, AC/DC converter 146, a regulator 147, a battery box 132 and the digital display 131.

The EEPROM 143 is adapted for electrically rewriting a content. The Miter encoder 144 is adapted for converting a signal from the optical sensor 62 of the rotation amount detecting unit 51 into a signal available for the microcomputer 142. The Bevel encoder 145 is adapted for converting a signal from the optical sensor 112 of the tilting amount detecting unit 101 into a signal available for the microcomputer 142. The AC/DC converter 146 is adapted for converting alternate current from a main power source into direct current. The regulator 147 is adapted for regulating or stabilizing an electric power. The battery box 132 and the AC/DC converter 146 are also connected to the Miter encoder 144, the Bevel encoder 145, and the digital display 131 for supplying electric power thereto. An electric power supply is controlled such that if a main power source through the AC/DC converter 146 is rendered OFF, an electric power from the battery box 132 is supplied to these components 144,145 and 131. On the other hand, if the main power source is rendered ON, an electric power from the main power source is supplied to these components 144,145, 131. Incidentally, the electric power from the battery box 132 is not supplied to the motive component such as the motor (not shown), but is only supplied to the microcomputer 142, the Miter encoder 144, the Bevel encoder 145 for the purpose of a control and measurement.

A Miter reset switch 148 for resetting the angular rotation of the turntable 21, a Bevel reset switch 149 for resetting the tilting angle of the tilt section 74, and a backlight switch 150 for lighting a backlight of the digital display 131 are also connected to the microcomputer 142. The digital display 131 is adapted for displaying a result of computation executed in the microcomputer 142 based on the outputs from the optical sensors 62, 112.

Cutting operation with the miter saw 1 will next be described. First, the workpiece is mounted on the upper surface of the base 11 while the workpiece is pushed onto the abutment surface of the fence 12. Then, the circular saw unit 4 is moved downward by pulling the handle 128 for cutting. For the cutting, the angled cutting is intended in which a cutting face is angled with respect to the abutment surface of the fence 12, or a slant cutting is intended in which a cutting face is slanted with respect to the upper surface of the base 11. For these cuttings, the following procedures are taken.

If the workpiece is to be cut with a cutting face angled with respect to the abutment surface of the fence 12, the turntable 21 is angularly rotated. Since the circular saw unit 4 is positioned above the turntable 21, the circular saw unit 4 is moved together with the turntable 21. Since the fence 12 is fixed to the base 11, the side surface of the circular saw blade 123 is angled relative to the workpiece as viewed from the above point of the workpiece. This cutting mode will be referred to as "angled cutting mode".

In the angled cutting mode, a cutting angle can be determined by the engagement of the upward protrusion 26B with one of the locking grooves 16a. For the engagement, the turntable 21 is angularly rotated while the lock lever 26 is not pressed down. Then, the upward protrusion 26B is brought into engagement with the desired one of the locking grooves 16a at the desired angle. With this state, the fixing handle 43 is fastened until the fixing handle 43 cannot be rotated any more, whereupon the tip end of the fixing handle 43 is pressed against the arcuate portion 16 of the base 11. Thus, the turntable 21 is fixed to the base 11. In this state, the angular rotation angle of the turntable 21 relative to the base 11 is precisely determined by the engagement between the locking groove 16a and the upward protrusion 26B. Therefore, fine adjustment to the angular rotation of the turntable 21 is not required.

For setting the cutting angle at a desired angle offset from the predetermined angles defined by the locking grooves 16a, the push-down portion 26A of the lock lever 26 is pushed down. Further, as shown in FIG. 25, the lock lever fixing pin 49 is pushed into a space within the frame 42, so that the tongue 26C is engaged with the annular fixing groove 49a. With this engagement, the engagement of the upward protrusion 26B with one of the locking grooves 16a is prevented even if the upward protrusion 26B is vertically in alignment with the locking groove 16a. Thus, the angular rotation angle of the turntable 21 can be set at a desired angle. After the tongue 26C is engaged with the annular fixing groove 49a, the turntable 21 is angularly rotated to a position near the desired angle in the miter saw 1 according to the first embodiment, the angular rotation angle can be displayed at every 0.2 degrees. Therefore, a desired angular rotating position of the turntable 21 cannot be easily provided by gripping the fixing handle 43 and moving the fixing handle 43. Therefore in the present embodiment, after the turntable 21 is angularly rotated to a position near the desired angle, then, a fine adjustment is performed to accurately provide the desired angle.

Figure 26:
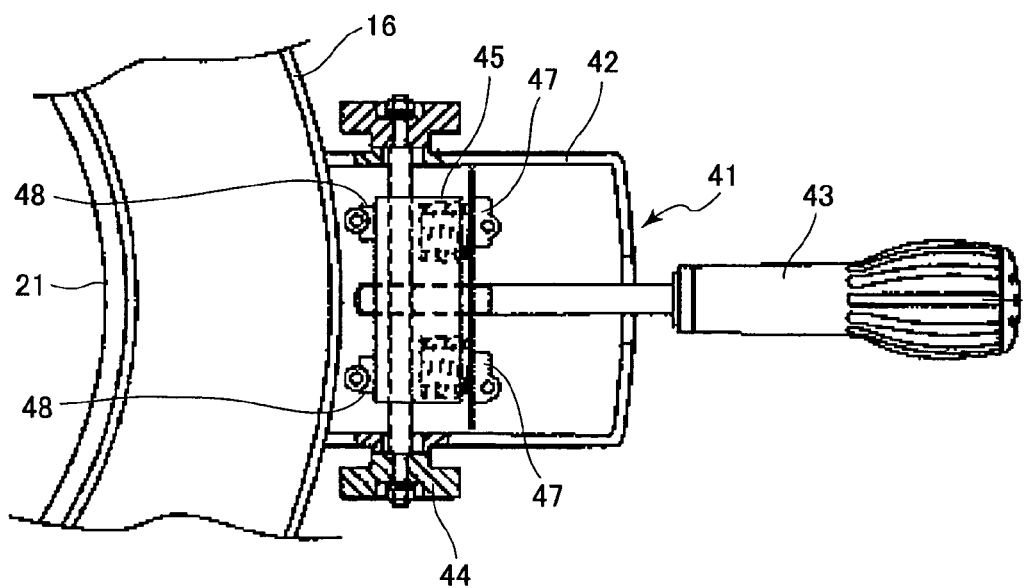
FIG. 26 is a plan view showing the rotation amount adjusting mechanism for the turntable in the miter saw according to the first embodiment.

More specifically, as shown in FIG. 26, the adjustment unit 41 provided at the turntable 21 is positioned near the desired angle relative to the arcuate portion 16 provided at the base 11. In this state, the tip end of the fixing handle 43 is separated from the outer peripheral surface of the arcuate portion 16, and further, the table contact piece 45 is in abutment with the rear wall 48 by the biasing force of the spring 46. This position of the table contact piece 45 is referred to as a release position.

Figure 27:
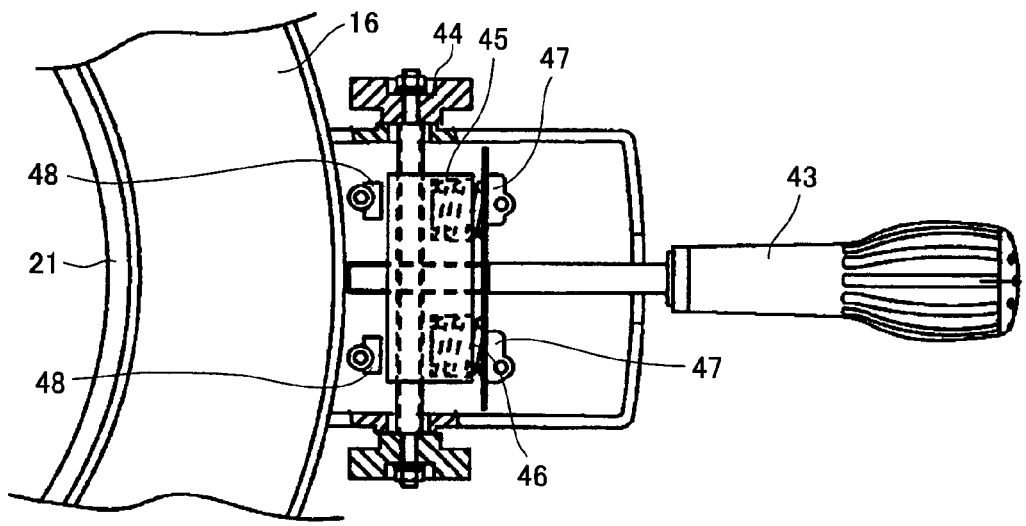
FIG. 27 is a plan view showing the rotation amount adjusting mechanism for the turntable, and particularly showing a temporary fixing position in the miter saw according to the first embodiment.
Figure 28:
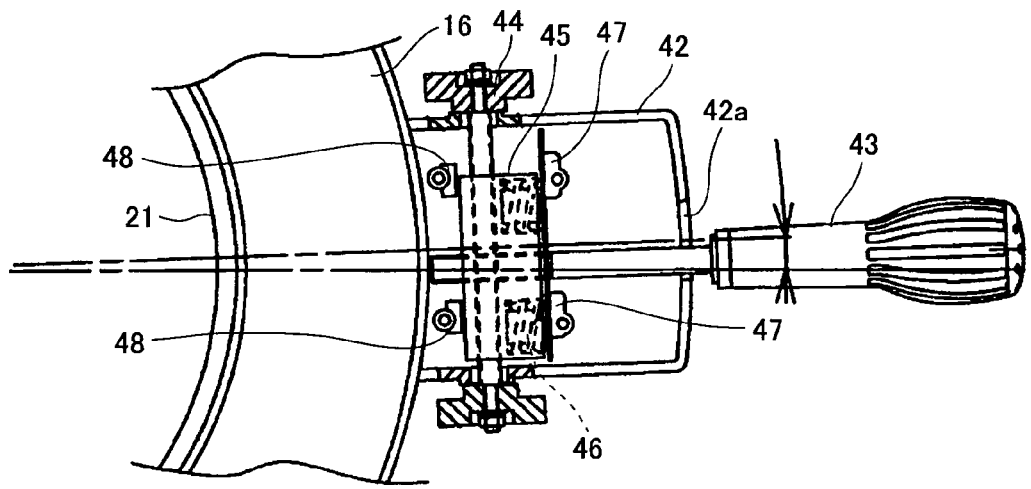
FIG. 28 is a plan view showing the rotation amount adjusting mechanism for the turntable, and particularly showing a fine-adjustment state in the miter saw according to the first embodiment.

Then in FIG. 27, the fixing handle 43 is rotated about its axis so as to press the tip end of the fixing handle 43 against the arcuate portion 16. Thus, the table contact piece 45 is moved away from the rear wall 48 to an adjustment position or a temporary fixing position because of the threading engagement of the male thread at the fixing handle 43 with the female thread in the piece 45. In this case, the fixing handle 43 functions as a base abutment member as well as a fixing mechanism. Further, the table contact piece 45 is spaced away from the front wall 47, and the fixing handle 43 in threading engagement with the table contact piece 45 is pressed against the arcuate portion 16 because of the reaction force of the spring 46. In this condition, the relative position among the fixing handle 43, the table contact piece 45, and the arcuate portion 16 is fixed. However, the table contact piece 45 is not directly fixed to the frame 42, but is merely supported within the frame 42 by means of the spring 46. Therefore, as shown in FIG. 28, relative position between the frame 42 and the table contact piece 45 can be changed by rotating the adjustment screw 44 about its axis. In other words, the position of the frame 42 in the angular rotating direction of the turntable 21 relative to the fixing handle 43 and the table contact piece 45 can be finely adjusted, the fixing handle 43 having been immovable in the angular rotating direction because of the intimate contact of the tip end of the fixing handle 43 with the arcuate portion 16. The fine adjustment can be performed within a length of the front opening 42a in the angular rotating direction as shown in FIG. 28 through which the shaft portion 43A of the fixing handle 43 extends. In the depicted embodiment, plus minus 2 degrees are set in terms of the angular rotation amount of the turntable 21 for the fine adjustment.

Upon angular rotation of the turntable 21, the rotation amount detection unit 51 is moved relative to the outer gear teeth segment 20. This moving amount is converted into the rotation amount of the first gear set 56 including the first gear 56A. The rotation angle of the first gear set 56 is amplified at the second gear set 58 and the detected segment 60, such that the angular rotation of 1 degree of the turntable 21 will cause angular rotation of 72 degrees of the detected segment 60. Since the disc like detected element 60B is formed with 100 slits arrayed in a circumferential direction, 20 slits stand for 72 degrees. Further, the detected element 20B enables detection of a minimum angular rotation of 0.05 degrees for the turntable 21.

Furthermore, the miter saw 1 generates cutting chips during cutting operation. However, the components of the detection unit 51 including the first gear set 56 and the optical sensor 62 are housed in the sealed housing 52, entry of the cutting chips into the housing 52 can be prevented. Consequently, precise detection of angular rotation of the turntable 21 can result. Thus, the turntable 21 can be moved to a precise angular rotational position by the manipulation to the adjusting screw 44 while observing the angle display at the digital display 131.

Figure 29:
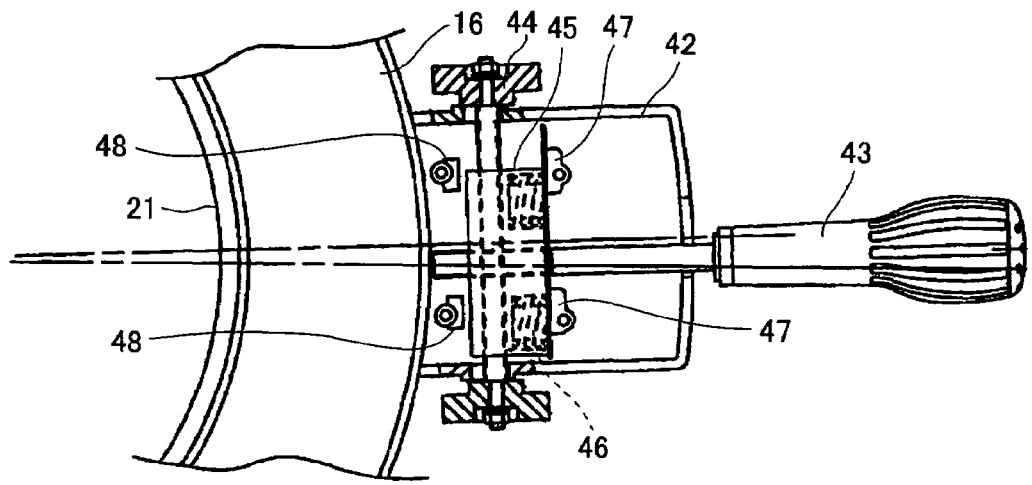
FIG. 29 is a plan view showing the rotation amount adjusting mechanism for the turntable, and particularly showing a full fixing position in the miter saw according to the first embodiment.

After the fine adjustment to the angular rotational position of the turntable 21, the fixing handle 43 is further clamped. As a result, the spring 46 is compressed, and as shown in FIG. 29, the table contact piece 45 is moved to its full fixing position where the table contact piece 45 is in abutment with the front wall 47 projecting from the frame 42. In this state, relative position between the frame 2 and the table contact piece 45 cannot be changed in spite of the rotation of the adjusting screw 44, since the table contact piece 45 is tightly pressed against the front wall 47. Accordingly, the displacement of the frame 42 relative to the arcuate portion 16 is prevented. (The arcuate portion 16 has been integrally with the table contact piece 45 through the fixing handle 43). Consequently, the displacement of the turntable 21 associated with the frame 42 relative to the base 11 associated with the arcuate portion 16 does not occur. Thus, the accurate angular rotating position of the turntable 21 can be promptly set and the set angle can be maintained for the angled cutting.

Next, if the cutting face on the workpiece is to be slanted with respect to the upper surface of the base 11 (hereinafter simply referred to as slant cutting), the circular saw unit 4 is slanted as shown in FIG. 4. As described above, the circular saw unit 4 is supported to the tilt section 74. The clamp shaft 81 is unfastened to release abutment between the slide wall 78 and the tilt motion support 71 so as to allow the tilt section 74 to be tiltable relative to the tilt motion support 71.

Accordingly, the circular saw unit 4 becomes tiltable because of its own weight. With this state, the side surface of the circular saw blade 123 is slanted relative to the upper surface of the workpiece.

Figure 30:
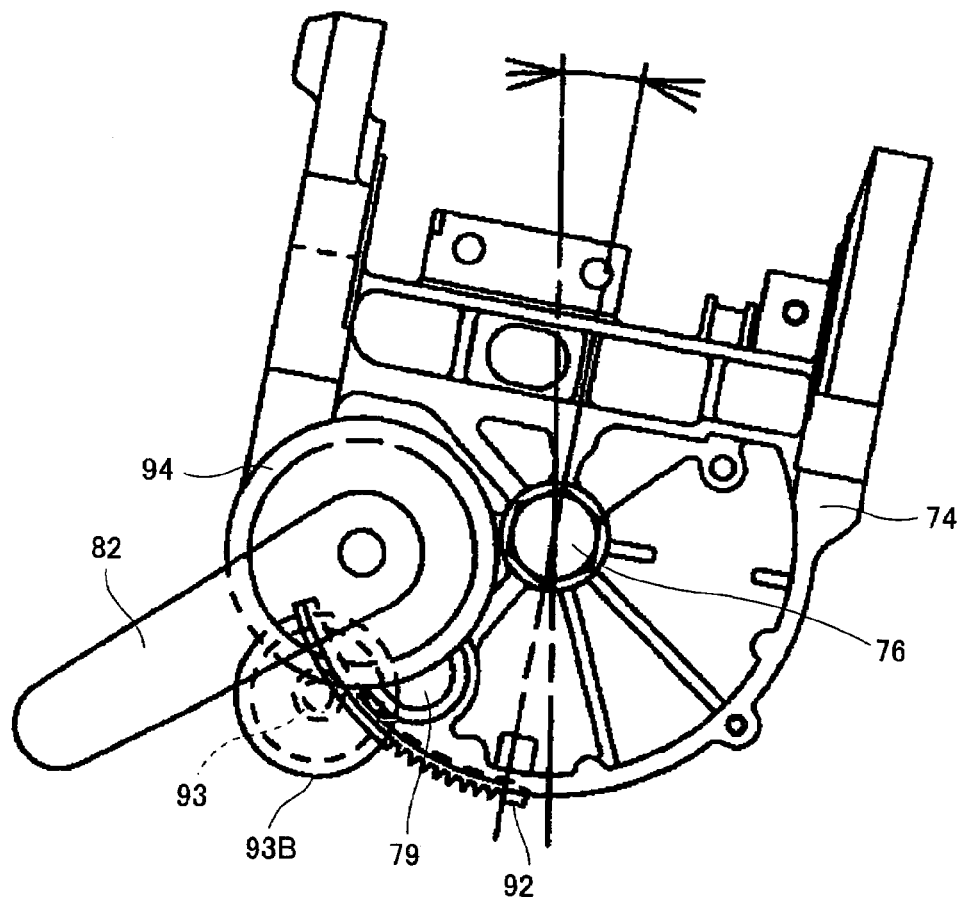
FIG. 30 is a rear view showing the mechanism for finely adjusting tilting angle of the circular saw unit in the miter saw according to the first embodiment.

In the slant cutting at a desired tilting angle, the circular saw unit 4 is maintained at a tilting angle near a desired tilting angle by operator's hand (FIG. 30). Then, the adjusting knob 94 is rotated to gradually pivotally move the tilt section 74 about an axis of the pin bolt 76 so as to position the circular saw unit 4 at its desired tilting angle. Then, the clamp lever 82 is operated to fix the tilt section 74 to the tilting motion support 71. Accordingly, accurate positioning is achievable with respect to the tilting angle of the circular saw unit 4. After fastening the clamp lever 82, the rotation of the rotation shaft 93 is prevented, since the arcuate gear teeth 92 is immovable.

By the pivotal movement of the tilt section 74, the tilt amount detection unit 101 is moved relative to the arcuate inner gear teeth 77. The moving amount of the unit 101 is converted into a rotation amount of the first gear 106A of the first gear set 106. The rotation angle of the first gear 106A is amplified at the second gear set 108 and the detected segment 110 such that the pivot angle of 1 degree of the tilt section 74 will cause angular rotation of 72 degrees of the detected segment 110. Since the disc like detected element 110B is formed with 100 slits arrayed in a circumferential direction, 20 slits stand for 72 degrees. Further, the detected element 110B enables detection of a minimum pivot angle of 0.05 degrees for the tilt section 74.

Furthermore, the miter saw 1 generates cutting chips during cutting operation. However, the components of the detection unit 101 including the first gear set 106 and the optical sensor 112 are housed in the sealed housing 102, entry of the cutting chips into the housing 102 can be prevented. Consequently, precise detection of pivot angle of the tilt section 74 can result. Thus, the tilt section 74 can be pivotally moved to a precise pivot position while observing the angle display at the digital display 131.

After the fine adjustment to the pivot position of the tilt section 74, the clamp shaft 81 is rotated by the clamp lever 82 so as to fix the tilt section 74 to the tilting motion support 71. As a result, the accurate tilting posture of the circular saw unit 4 can be promptly set and the set posture can be maintained for the slant cutting at the desired slant angle.

Next, a control routine for angle display at the digital display 131 will be described in case of the angled cutting and slant cutting. The detection of the angular rotation amount and the pivot angle can be made by an electrical power supplied from the battery box 132.

Figure 31:
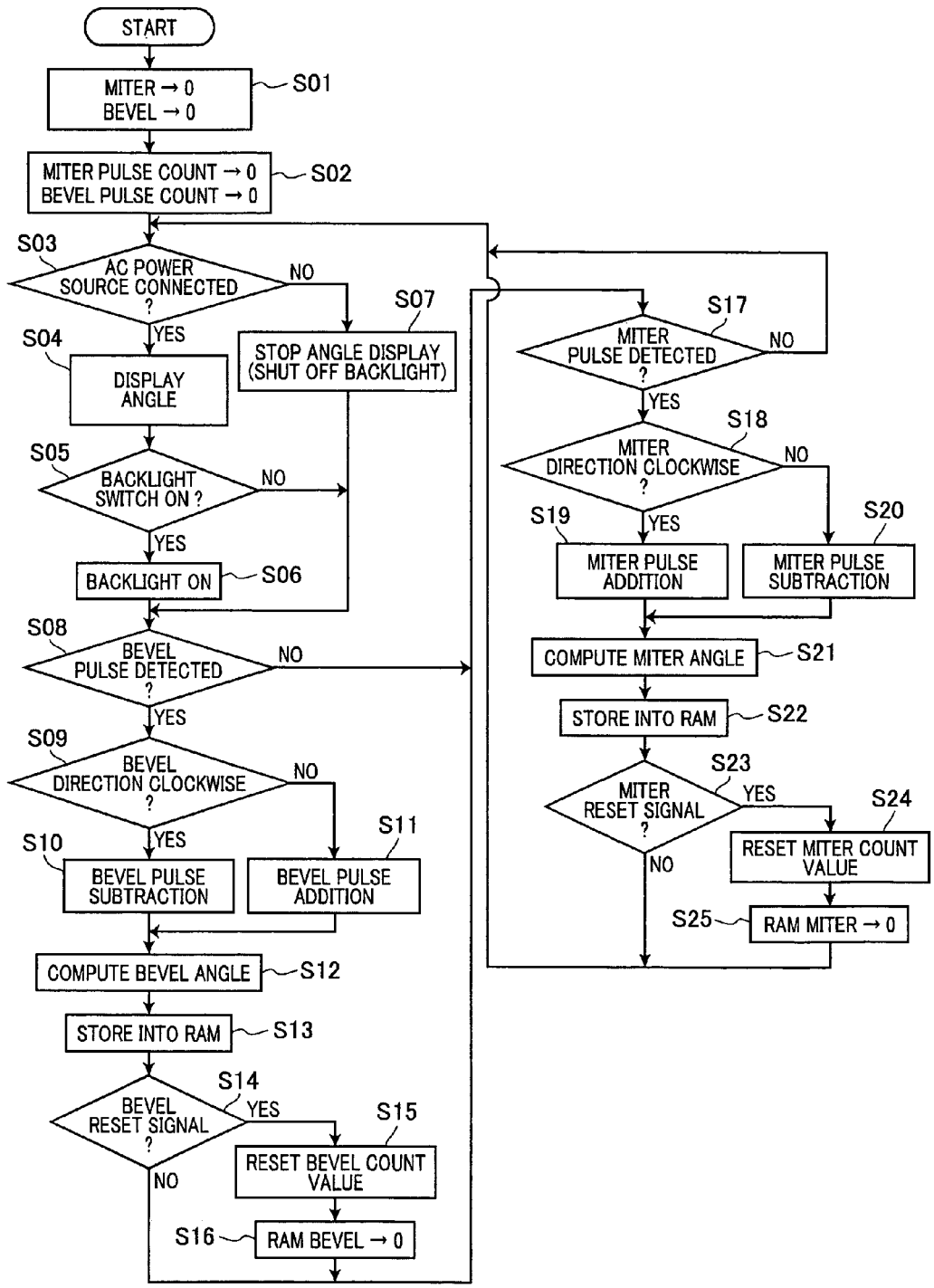
FIG. 31 is a flowchart showing a processing routine for displaying rotation angle of a turntable and a tilting angle of a circular saw blade in the miter saw according to the first embodiment.

When a battery is assembled into the battery box 132, a control shown in FIG. 31 is started. Then, the angular rotation angle (Miter) and tilting angle (Bevel) held in a RAM are set to zero (S1). The RAM is a memory accommodated in the microcomputer 142. Then, the routine proceeds into S2 where optical pulse count value at the optical sensors 62 and 112 are set to zero.

Then, the microcomputer 142 performs detection as to the connection to AC power source (S03). If the AC power source has not been connected (S03:No), the routine proceeds into S7, where power supply to the digital display 131 is stopped to stop angle display, and the backlight is shut off if the backlight switch 150 had been turned ON for lighting the backlight, and then the routine goes into S08. On the other hand, if connection of AC power source is confirmed (S03:Yes), the routine is advanced into S04 where a predetermined angle (the above "0" degree) is displayed and the routine goes into S05. In S05, judgment is made as to whether or not the backlight switch 150 had been turned ON. If the backlight switch 150 has been rendered ON (S05:Yes), the backlight is turned ON (S06), and then the routine is proceeded into S08. If the backlight switch 150 had not been turned ON (S05:No), the routine proceeds into S08.

In S08, existence of optical pulse at the optical sensor 112 is detected. Non detection of the optical pulse (S08;No) implies non-rotation of the detected segment 110 formed with the slits 110C, which implies that the tilt section 74 is not pivotally moved and thus the circular saw unit 4 is not tilted. Therefore, the routine is skipped into an angular rotation angle detection routine starting from S17 while neglecting the subsequent tilting angle detection routine from S09 to S16. On the other hand, if optical pulse is detected (S08:Yes), the routine proceeds into S09.

In S09, tilting direction of the circular saw unit 4 is detected. If the circular saw unit 4 is tilted leftward as viewed from the front of the miter saw 1, that is, if the tilt section 74 is pivoted relative to the tilting motion support 71 in the counterclockwise direction (S09:No), the routine proceeds into S11 where the pulse numbers corresponding to the tilting angle are added. Then, the routine proceeds into S12 where an angle to be displayed on the digital display 131 is computed. On the other hand, if the circular saw unit 4 is tilted rightward as viewed from the front of the miter saw 1, that is, if the tilt section 74 is pivoted relative to the tilting motion support 71 in the clockwise direction (S09:Yes), the routine proceeds into S10 where the pulse numbers corresponding to the tilting angle are subtracted. Then, the routine proceeds into S12 where an angle to be displayed on the digital display 131 is computed. More specifically, addition or subtraction is made at every 0.05 degrees relative to the angle stored in the RAM in such a manner that detection of 20 pulses at the disc like detected element 110B amounts to the tilting angle of 1 degree. After the computation of the display angle in S12, the routine proceeds into S13 where the display angle is stored into the RAM.

Then, in S14, judgment is made as to whether or not the Bevel reset switch 149 is turned ON. The Bevel reset switch 149 is adapted for resetting the tilting angle up to S13 to zero. If the Bevel reset switch 149 is not turned ON (S14:No), the routine proceeds into S17 in order to start angular rotation angle display routine. On the other hand, if the Bevel reset switch 149 is turned ON (S14:Yes), the routine proceeds into S15 where the optical pulse count value is set to zero, and then the value stored in the RAM is cleared to zero in S16. Then, the routine proceeds into S17.

S17 through S25 pertain to process for angular rotation amount display for the turntable 21. In S17, existence of optical pulse at the optical sensor 62 is detected. Non detection of the optical pulse (S17;No) implies non-rotation of the detected segment 60 formed with the slits 60C, which implies that the turntable 21 is not angularly rotated. Therefore, the routine is returned back to S03 neglecting the subsequent angular rotation amount display routine from S18 to S25. On the other hand, if optical pulse is detected (S17:Yes), the routine proceeds into S18.

In S18, angular rotating direction of the turntable 21 is detected. If the turntable 21 is rotated in counter-clockwise direction as viewed from the top of the miter saw 1 (S18:No), the routine proceeds into S20 where the pulse numbers corresponding to the rotation amount are subtracted. Then, the routine proceeds into S21 where a rotation angle to be displayed on the digital display 131 is computed. On the other hand, if the turntable 21 is rotated in the clockwise direction as viewed from the top of the miter saw 1, (S18:Yes), the routine proceeds into S19 where the pulse numbers corresponding to the rotation amount are added. Then, the routine proceeds into S21 where an angle to be displayed on the digital display 131 is computed. More specifically, addition or subtraction is made at every 0.05 degrees relative to the angle stored in the RAM in such a manner that detection of 20 pulses at the disc like detected element 60B amounts to the rotation angle of 1 degree. After the computation of the display angle in S21, the routine proceeds into S22 where the display angle is stored into the RAM.

Then, in S23, judgment is made as to whether or not the Miter reset switch 148 is turned ON. The Miter reset switch 148 is adapted for resetting the rotation angle up to S22 to zero. If the Miter reset switch 148 is not turned ON (S23:No), the routine proceeds into S03 in order to repeat the above described processing routine. On the other hand, if the Miter reset switch 148 is turned ON (S23:Yes), the routine proceeds into S24 where the optical pulse count value is set to zero, and then the value stored in the RAM is cleared to zero in S25. Then, the routine proceeds into S03 to repeat the above-described processing routine.

Incidentally, the process from S17 to S25 for the rotation angle displaying routine can be executed prior to the process from S08 to S16 for the pivot angle displaying routine. Alternatively, consequential steps S08 to S16 and another consequential steps S17 to S25 can be performed almost simultaneously through a multi-task processing.

The above-described processing is always executed as long as an electric power is supplied from the battery box 132 even if a main AC power source is not connected, and therefore, angular rotation amount of the turntable 21 and the tilting angle of the circular saw unit 4 can be always recognized. That is, those angles in the former cutting operation can be maintained. In other words, the miter saw 1 can be promptly operated without initial adjustment of the rotation angle and the tilting angle when the AC power source is connected if these angles for the former cutting operation is still available for the subsequent cutting operation. Further, an electric power level supplied from the battery box 132 is dependent on the power storage amount in the battery in the battery box 132. If the storage amount becomes vacant, the power supply will be stopped. In order to avoid this problem, a control can be made to shut off the power supply from the battery box 132 and to start power supply from the AC power source to the control circuit when the AC power source is connected. This control can also be made to start power supply from the battery box 132 if the AC power source is then disconnected.

The miter saw according to the present invention is not limited to the above-described embodiments, but various modifications may be conceivable.

Figure 32:
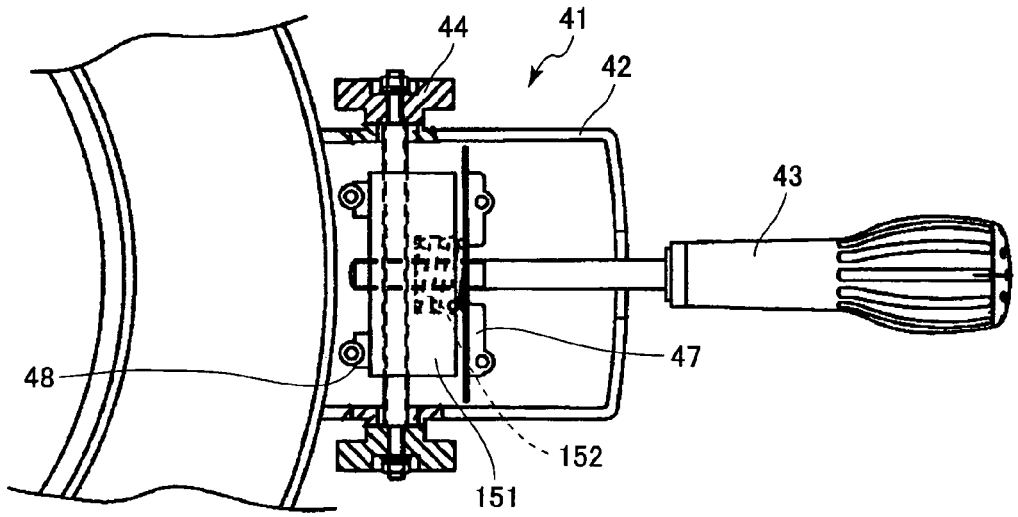
FIG. 32 shows a first modification and is a plan view of a mechanism for fine-adjusting rotation angle of the turntable.

FIG. 32 shows a first modification pertaining to the adjustment unit 41, wherein like parts and components are designated by the same reference numerals and characters as those shown in the foregoing embodiments. In the first modification, a single spring 152 is interposed between a table contact piece 151 (corresponding to the table contact piece 45) and the front wall 47 instead of two springs 46. This modification can reduce components or parts that constitute the adjustment unit 41.

Figure 33:
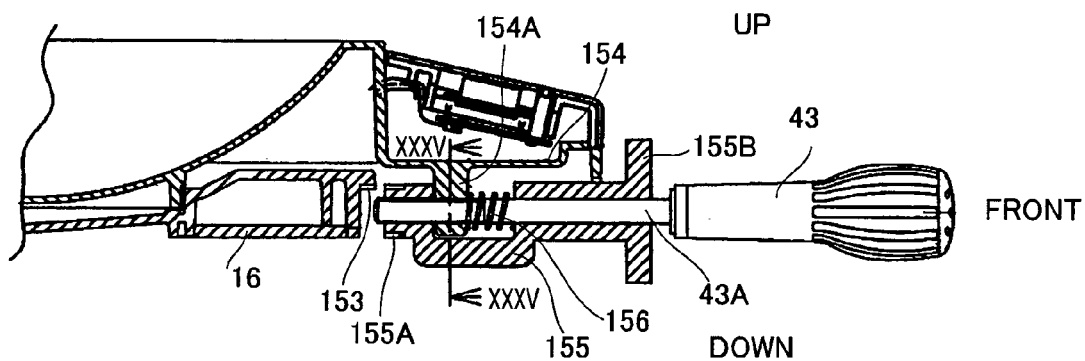
FIG. 33 shows a second modification and is a cross-sectional view of a mechanism for adjusting rotation angle of the turntable.
Figure 34:
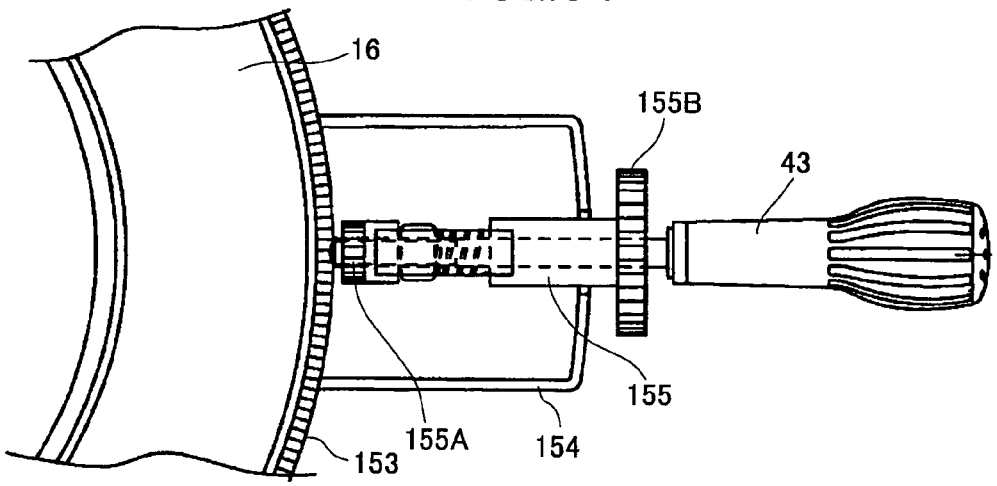
FIG. 34 is a bottom view of the second modification.
Figure 35:
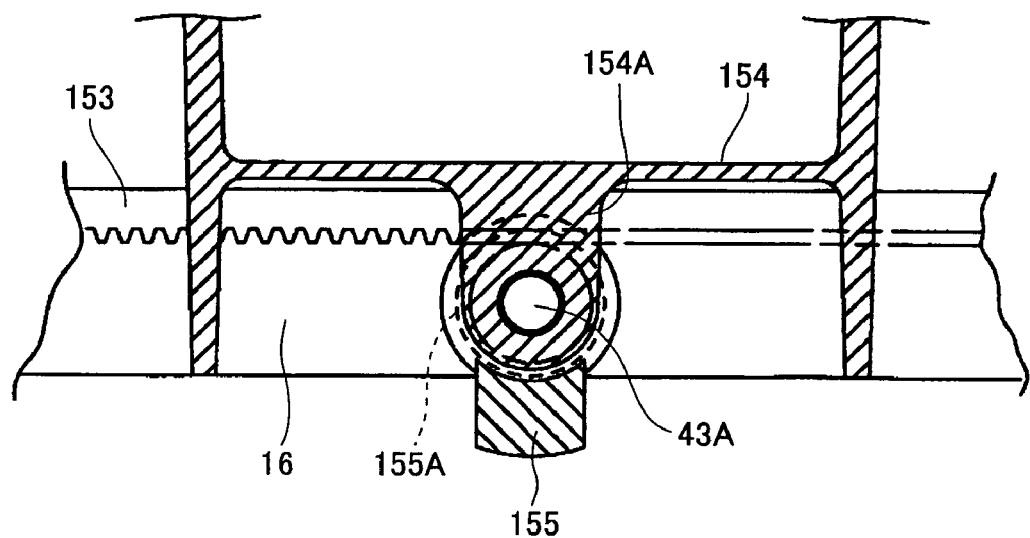
FIG. 35 is a frontal cross-sectional view of the second modification.

A second modification pertaining to the adjustment unit is shown in FIGS. 33 through 35. The arcuate portion 16 of the base has a lower surface at its outer peripheral side, and the lower surface is formed with gear teeth 153 facing downward. A frame 154 of the turntable is provided with a support portion 154A extending downward therefrom, and a female thread extending frontward/rearward is formed in the support portion 154A. The shaft portion 43A of the fixing handle 43 is threadingly engaged with the female thread. By rotating the fixing handle 43 about its axis in one direction, the tip end of the fixing handle 43 is brought into abutment with the arcuate portion 16 so as to fix the position of the frame 154 relative to the arcuate portion 16.

An adjustment member 155 is disposed over the shaft portion 43A, and rides over the support portion 154A. A spring 156 is disposed over the shaft portion 43A and interposed between a front surface of the support portion 154A and the adjustment member 155 for urging the adjustment member 155 frontward. The adjustment member 155 has a rear end integrally provided with a gear wheel 155A meshedly engageable with the gear teeth 153. The adjustment member 155 has a front end integrally provided with a knob 155B.

Fine adjustment for the rotational position of the turntable 21 using the adjustment member 155 will be described. After the turntable 21 having the frame 154 is rotated to a position near the predetermined rotation angle, the adjustment member 155 is pressed rearward to allow the gear wheel 155A to be meshingly engaged with the gear teeth 153. While maintaining this meshing engagement, the knob 155B is rotated about its axis to perform fine control. Then, the fixing handle 43 is fastened, so that the position of the frame 154 relative to the arcuate portion 16 is fixed at the desired rotational position of the turntable 21.

Figure 36:
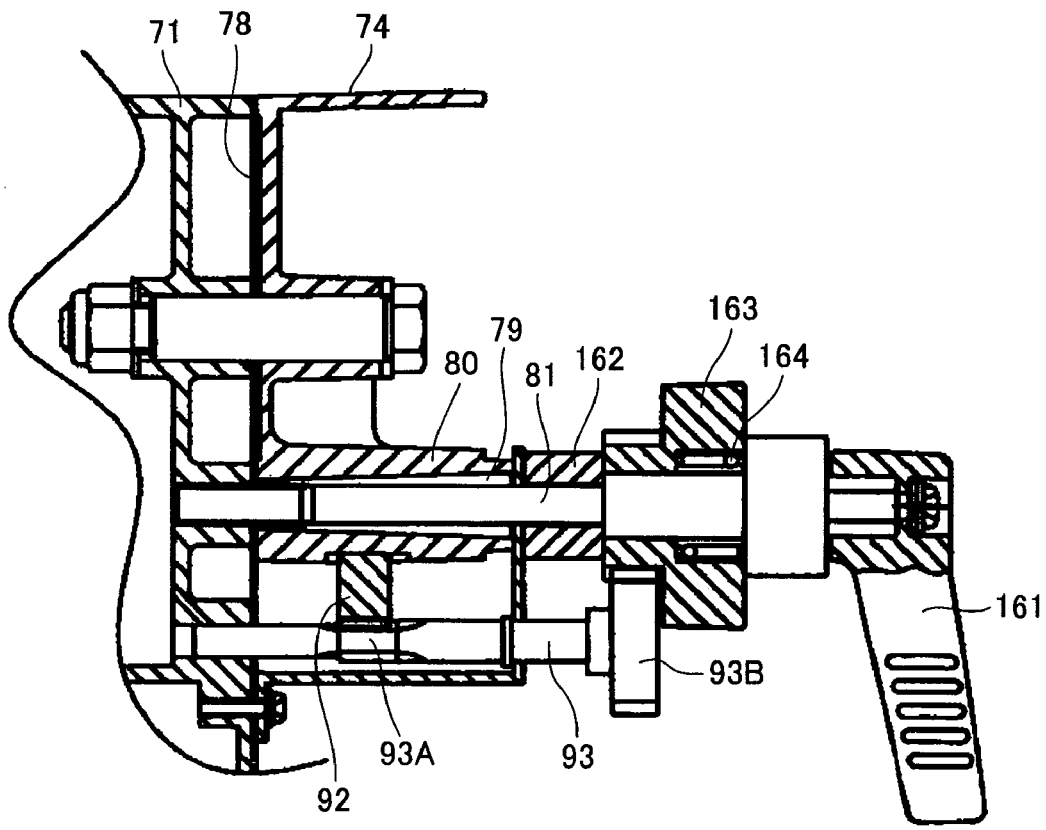
FIG. 36 shows a third modification and is a cross-sectional view of a mechanism for adjusting tilting angle of the circular saw unit.

A third modification pertaining to a fine adjustment to the tilting angle will be described with reference to FIG. 36 wherein like parts and components are designated by the same reference numerals as those shown in FIGS. 18. A spring 164 is interposed between a fine adjustment knob 163 and a clamp lever 161 for normally urging the fine adjustment knob 163 rearward through a spacer 162, so that the slide wall 78 of the tilt section 74 is urged toward the tilt motion support 71. Thus, friction force is generated between the slide wall 78 and the tilt motion support 71.

If the intimate contact of the slide wall 78 to the tilt motion support 71 is released upon unfastening the clamp lever 161, the circular saw unit 4 is urged to be tiltingly moved due to its own weight. However, this tilting motion due to the own weight can be restrained because of the friction force still imparted between the slide wall 78 and the tilting motion support 71 by the biasing force of the spring 164.

Further, free rotation of the fine adjustment knob 163 is restrained because of the biasing force of the spring 164 is imparted on the knob 163. Accordingly, a tilting movement of the tilt section 74 is also restrained since the tilt section 74 is connected to the fine adjustment knob 163 through the rotation shaft 93. Thus, tilting motion of the circular saw unit 4 due to its own weight can be restrained. This means that it is unnecessary to manually support the circular saw unit 4 at a given posture by user's hand during fine adjustment to the tilting angle of the circular saw unit 4. This facilitates the fine adjustment.

A fourth modification pertaining to a fine adjustment to the tilting angle will be described with reference to FIGS. 37 and 38. A shaft support 169 is rotatably supported in a peripheral side of the turntable at a position below the tilt section 74. A fine adjustment shaft 167 has one end connected to the shaft support 169, so that the fine adjustment shaft 167 is pivotally movable about an axis of the shaft support 169. The fine adjustment shaft 167 has an intermediate portion formed with a worm 166 selectively engageable with the arcuate gear teeth 92. The fine adjustment shaft 167 has a free end integrally provided with a fine adjustment knob 168. A stop 170 extends from the peripheral side of the turntable so as to limit the pivotal movement of the fine adjustment shaft 167 in a direction away from the arcuate gear teeth 92.

Figure 37:
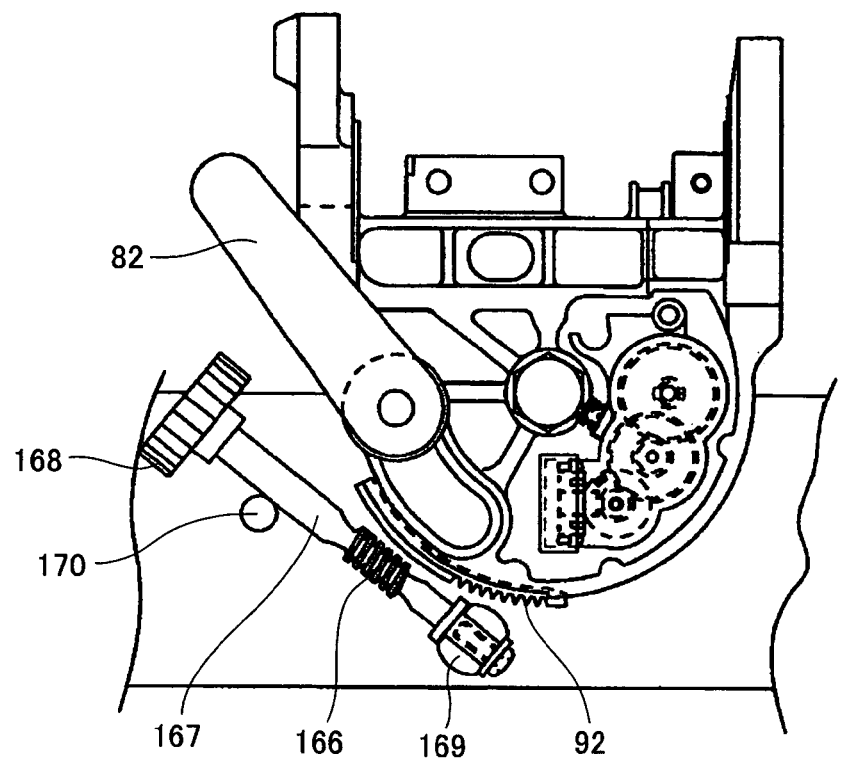
FIG. 37 shows a fourth modification and is a rear view of a mechanism for adjusting tilting angle of the circular saw unit.
Figure 38:
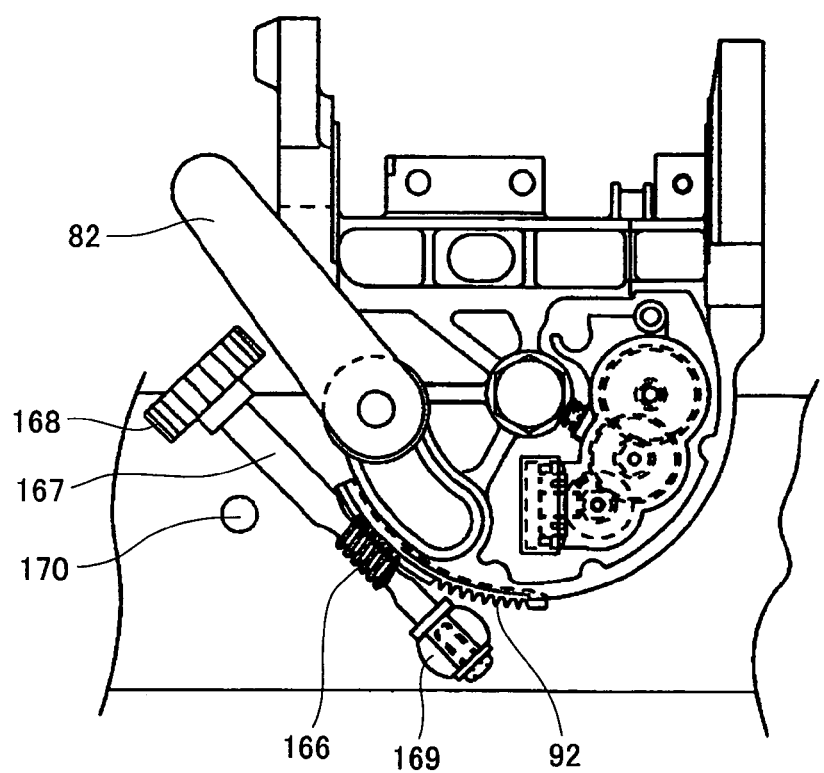
FIG. 38 is a rear view according to the fourth modification.

Normally, the fine adjustment shaft 167 is in abutment with the stop 170, so that the worm 166 is disengaged from the arcuate gear teeth 92 as shown in FIG. 37. If the circular saw unit 4 is to be tiltingly moved to a desired tilting angle position, the fine adjustment shaft 167 is pivotally moved toward the arcuate gear teeth 92 so as to engage the worm 166 with the arcuate gear teeth 92 as shown in FIG. 38, after the circular saw unit 4 is tiltingly moved to a position near the desired tilting angle position. By this engagement, tilting posture of the circular saw unit 4 can be maintained. Then, the fine adjustment knob 168 is rotated about its axis so that the arcuate gear teeth 92 is moved about the axis of the pivot bolt 76. The movement of the arcuate gear teeth 92 implies the tilting movement of the tilt section 74 about the axis of the pivot bolt 76. Thus, the tilting angle of the circular saw blade 123 can be subjected to fine adjustment. Then, the clamp lever 82 is fastened to fixedly secure the tilting angle.

Since the fine adjustment knob 168 is movable to the engagement position in meshing engagement with the arcuate gear teeth 92 and to a non-engagement position in out of engagement therefrom, the worm 166 is only engaged with the arcuate gear teeth 92 when the fine tilting angle control is required. In other words, resistive force is not applied when the circular saw unit is tiltingly moved prior to the fine adjustment.

Figure 39:
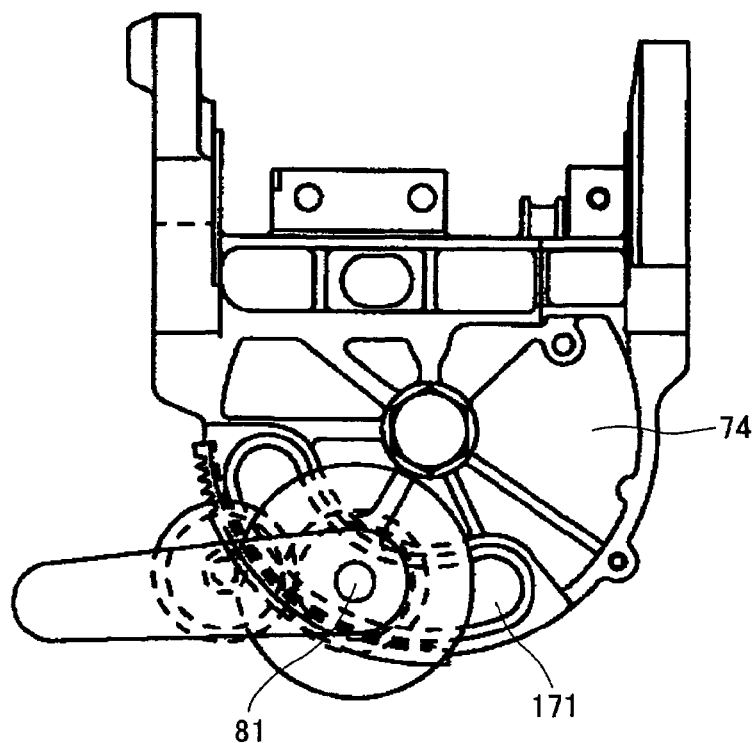
FIG. 39 shows a fifth modification and is a rear view of a mechanism for adjusting tilting angle of the circular saw unit.

A fifth modification pertaining to a fine adjustment to the tilting angle will be described with reference to FIG. 39. An arcuate elongated slot 171 is formed longer than that of the elongated slot 79, so that the tilt section 74 can be tiltable to the angle of about 45 degrees in both clockwise and counterclockwise directions. Thus, the circular saw unit 4 can be tilted to about 45 degrees in rightward and to 45 degrees in leftward.

Figure 40:
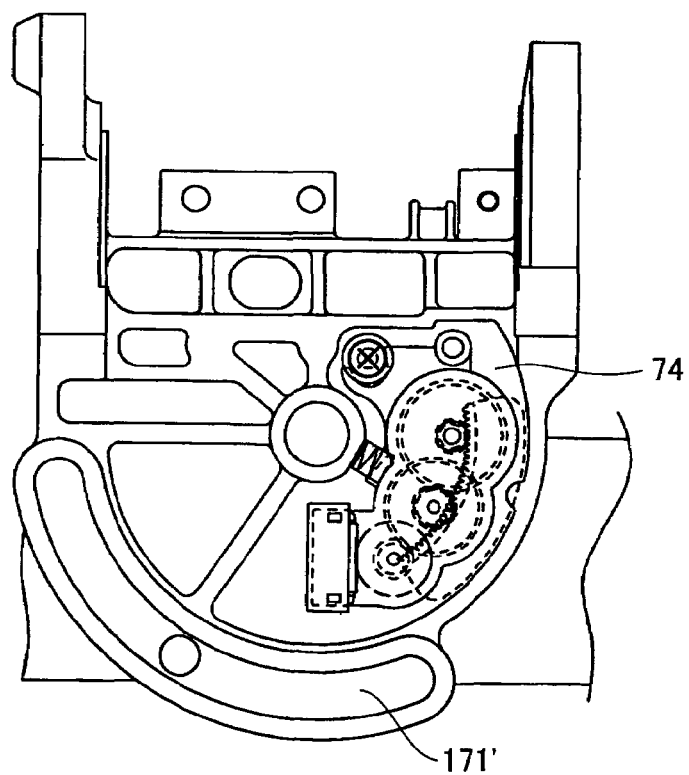
FIG. 40 shows a sixth modification and is a rear view of a mechanism for adjusting tilting angle of the circular saw unit.

A sixth modification pertaining to a fine adjustment to the tilting angle is shown in FIG. 40. According to the modification, an arcuate elongated slot 171' is positioned along an outer peripheral edge of the tilt section 74.

Figure 41:
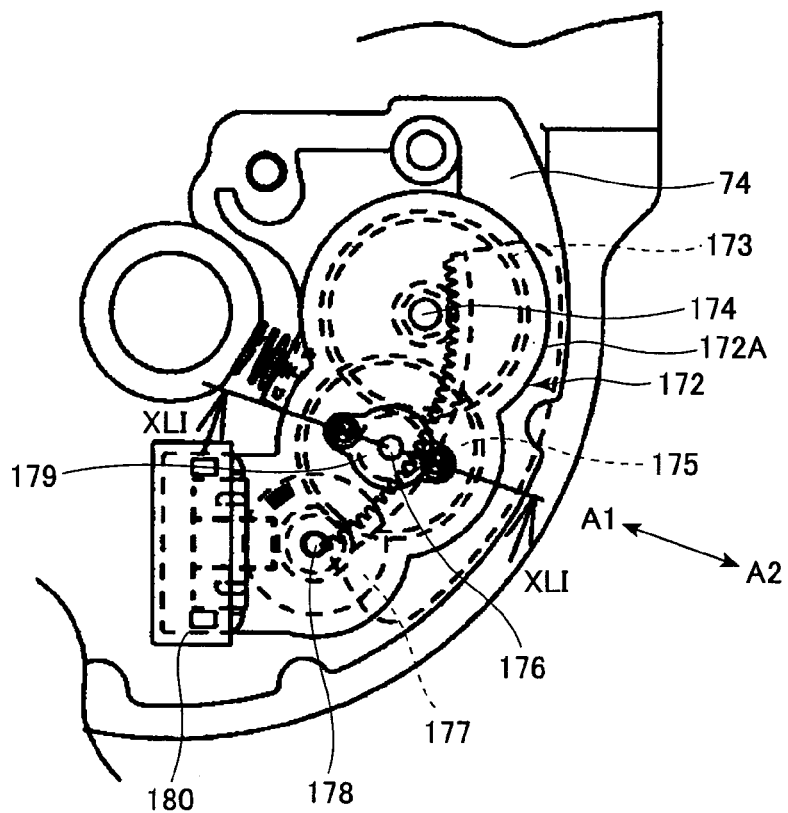
FIG. 41 shows a seventh modification and is a rear view of a tilting amount detection unit.
Figure 42:
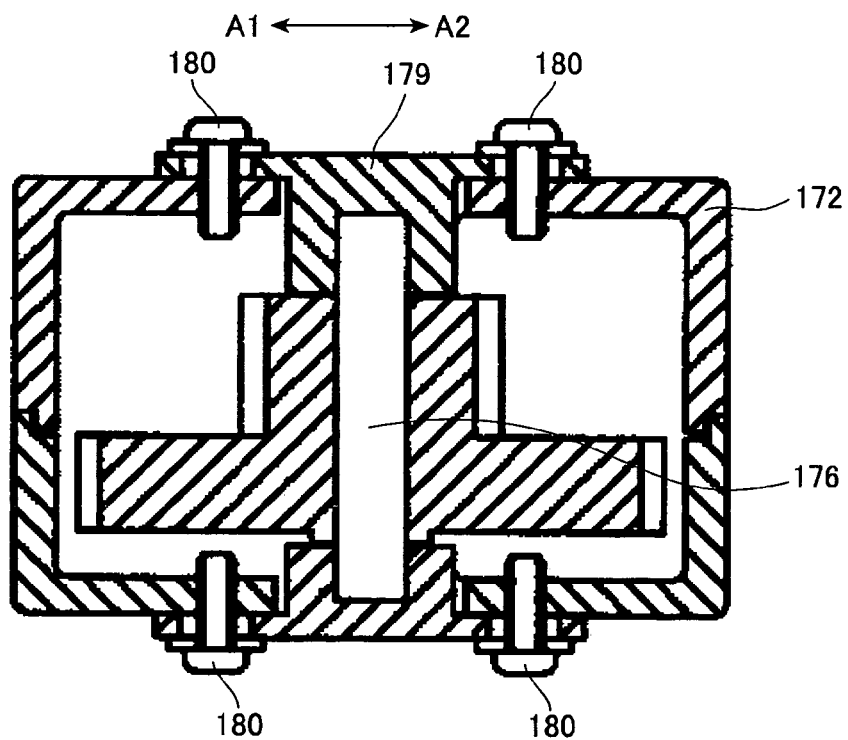
FIG. 42 is a cross-sectional view taken along the line XLI-XLI of FIG. 41.

A seventh modification pertaining to a tilting amount detection unit is shown in FIGS. 41 and 42. A tilting amount detection unit 172 includes a housing 172A in which rotation shafts 174 and 178 are rotatably supported. A shaft support 179 is attached to the housing 172A for rotatably supporting a rotation shaft 176.

A first gear set 173, a second gear set 175 and detected segment 177 are coaxially mounted on the shafts 174, 176, 178, respectively. Geometrical relationship among the rotation shafts 174,176,178 is such that a line connecting the rotation shafts 174 and 178 is assumed to be a base line of a triangle, and the rotation shaft 176 is at an apex of the triangle. The shaft support 179 is movable in a direction perpendicular to the line connecting the rotation shafts 174 and 178 and perpendicular to the rotation shaft 176 as shown by arrows A1 and A2. Further, the shaft support 179 can be fixed to the housing 172A by screws 175. An optical sensor 180 is provided beside the detected segment 177.

For assembly, the shaft support 179 is urged in the direction A1 (toward the line connecting the rotation shafts 174 and 178) so as to maintain meshing engagement of the second gear set 175 with the first gear set 173 and the detected segment 177. Then, the screws 180 are fastened to fix the shaft support 179 to the housing 172A. With this arrangement, any rattling among the first gear set 173, the second gear set 175 and the detected segment 177 does not occur. Accordingly, accurate rotation amount of the detected segment 177 in response to the rotation of the first gear set 173 can be obtained, thereby enhancing detection accuracy at the optical sensor 180. A modification is conceivable to the seventh modification such that the shaft support 179 is not fixed to the housing 172A, and a biasing member such as a spring is provided for biasing the shaft support 179 in the direction A1.

Figure 43:
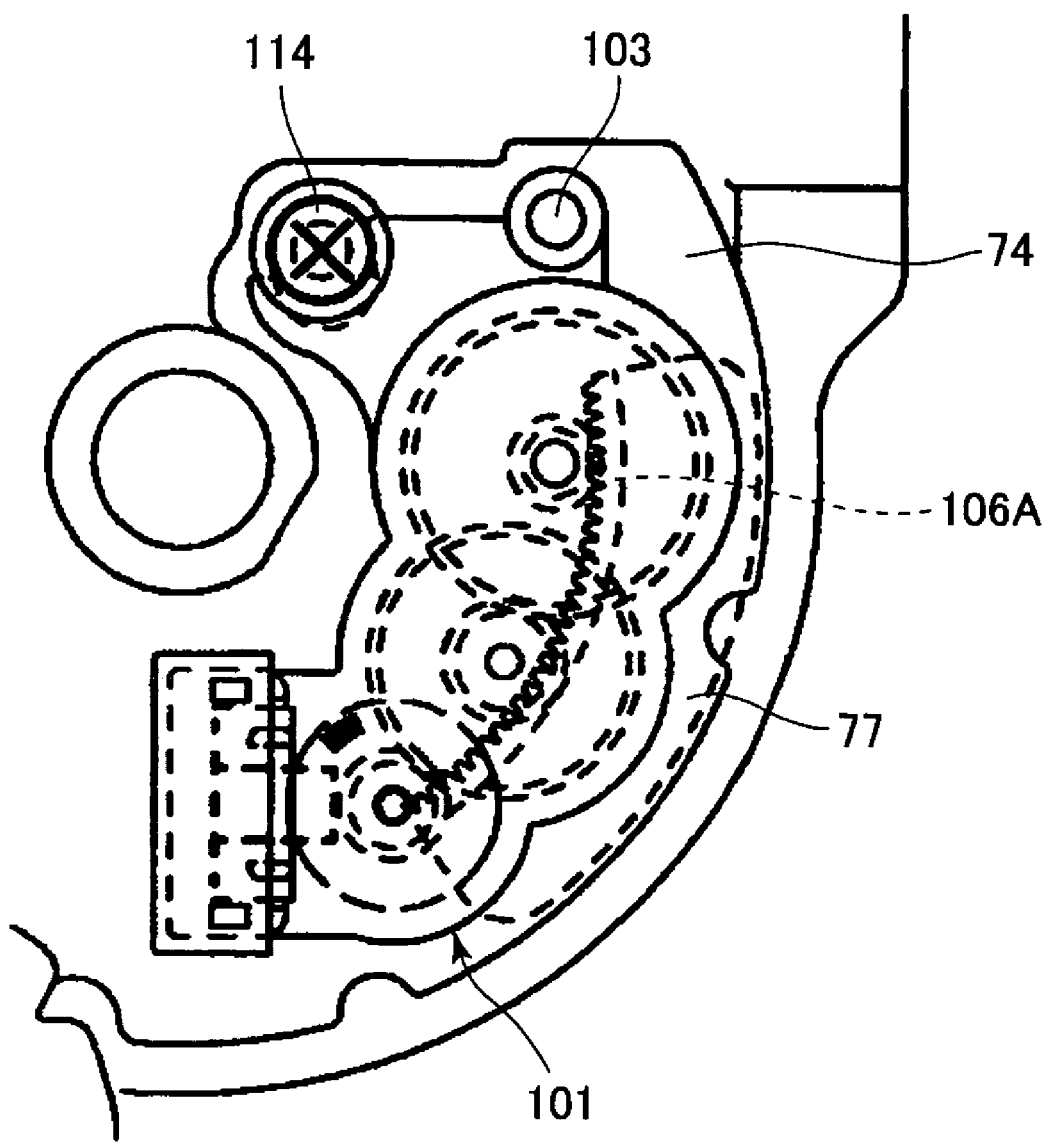
FIG. 43 shows an eighth modification and is a rear view of a tilting amount detection unit.

An eighth modification pertaining to a tilting amount detection unit is shown in FIG. 43. According to this modification, the spring 105 in the tilting amount detection unit 101 (FIG. 19) is dispensed with. The tilting amount detection unit 101 is pivotally moved about the axis of the pin 113 so as to meshingly engage the first gear 106A with the arcuate inner gear teeth 77. Then, the screw 114 is fastened to maintain the meshing engagement without rattling. Thus, the position of the tilting amount detection unit 101 can be fixed relative to the arcuate inner gear teeth 77, thereby accurately detecting the tilting angle of the tilt section 74 relative to the tilting motion support 71.

A modification pertaining to a tilting amount detection unit will be described. A low output and low power consumption motor (not shown) is drivingly coupled to the rotation shaft 111 or 178 of the detected segment 110 or 177 so that positive rotation force is imparted on the shaft 111 or 178. By the rotation force, the rotation shafts 107, 109 or 174,176 are urged to be rotated. However, since the first gear 106 or 173 is engaged with the arcuate inner gear teeth 77, and since rotation torque of the motor is extremely small, the detected segment, the first gear set and the second gear set are not rotated. Still however, because of the application of the rotational force by the motor, no rattling occurs between engaging regions. Further, even if relative movement occurs between the arcuate inner gear teeth 77 and the tilting amount detection unit 101 by the tilting motion of the tilt section 74, the motor does not affect the relative movement, since the output of the motor is extremely small. Furthermore, because of the employment of the low power consumption motor, power from the battery box 132 can be used for energizing the motor even if the main power source is not connected.

The above-described modifications to the tilting amount detection unit are also available for the rotation amount detection unit 51. Further, in the above-described embodiments, gears are used for transmitting rotation to the detected segment. Here, friction wheels can be used instead of the gears for amplifying and transmitting rotation.

Figure 44:
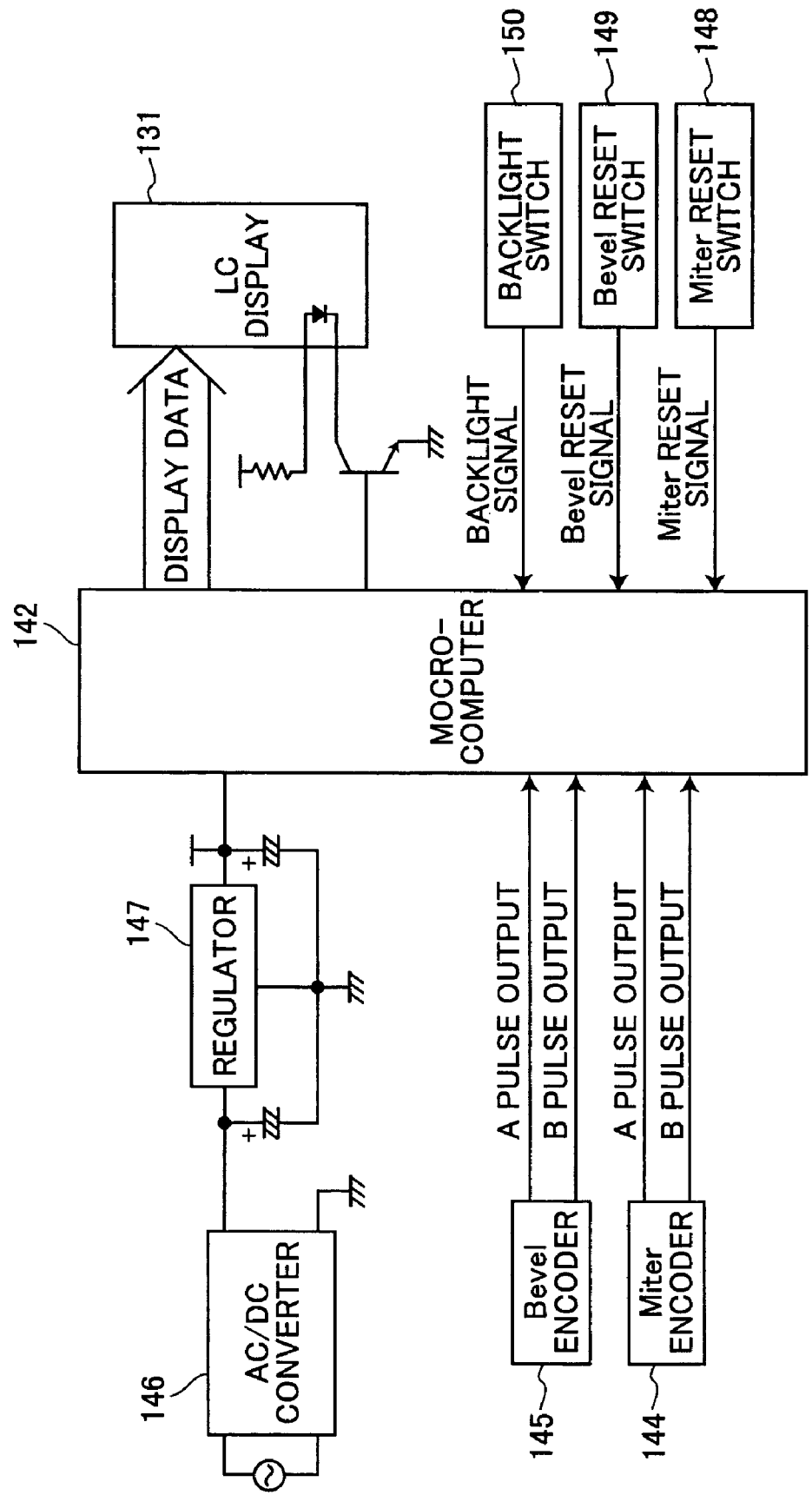
FIG. 44 shows a ninth modification and is a block diagram of a control circuit which is a modification to the control circuit of FIG. 24.

A ninth modification pertaining to a control circuit is shown in FIG. 44. In the control circuit shown in FIG. 24, the battery box 132 is provided for continuously measuring rotation amount of the turntable 21 and tilting amount of the circular saw unit 4. However, in the control circuit shown in FIG. 44, the battery box 132 is dispensed with. In the latter case, if the turntable 21 is angularly rotated or the circular saw unit 4 is tiltingly moved while the AC power source is disconnected, computation of such angle cannot be made in the microcomputer 142. Even if the AC power source is connected thereafter, the rotation amount and tilting amount is unknown. To avoid this problem, a notice as to the necessity of zero resetting can be displayed on the digital display 131. After the turntable 21 is set to zero angle position, and after the circular saw unit 4 is set to zero angle position in response to the notice by the display 131, Miter reset switch 148 and the Bevel reset switch 149 are pressed for initialization. Then, the turntable is angularly rotated or the circular saw unit 4 is tiltingly moved.

Further, the set position of the battery box 132 is not limited to within the semi-circular recess 24, but can be disposed at the lower surface of the base 11.

Figure 45:
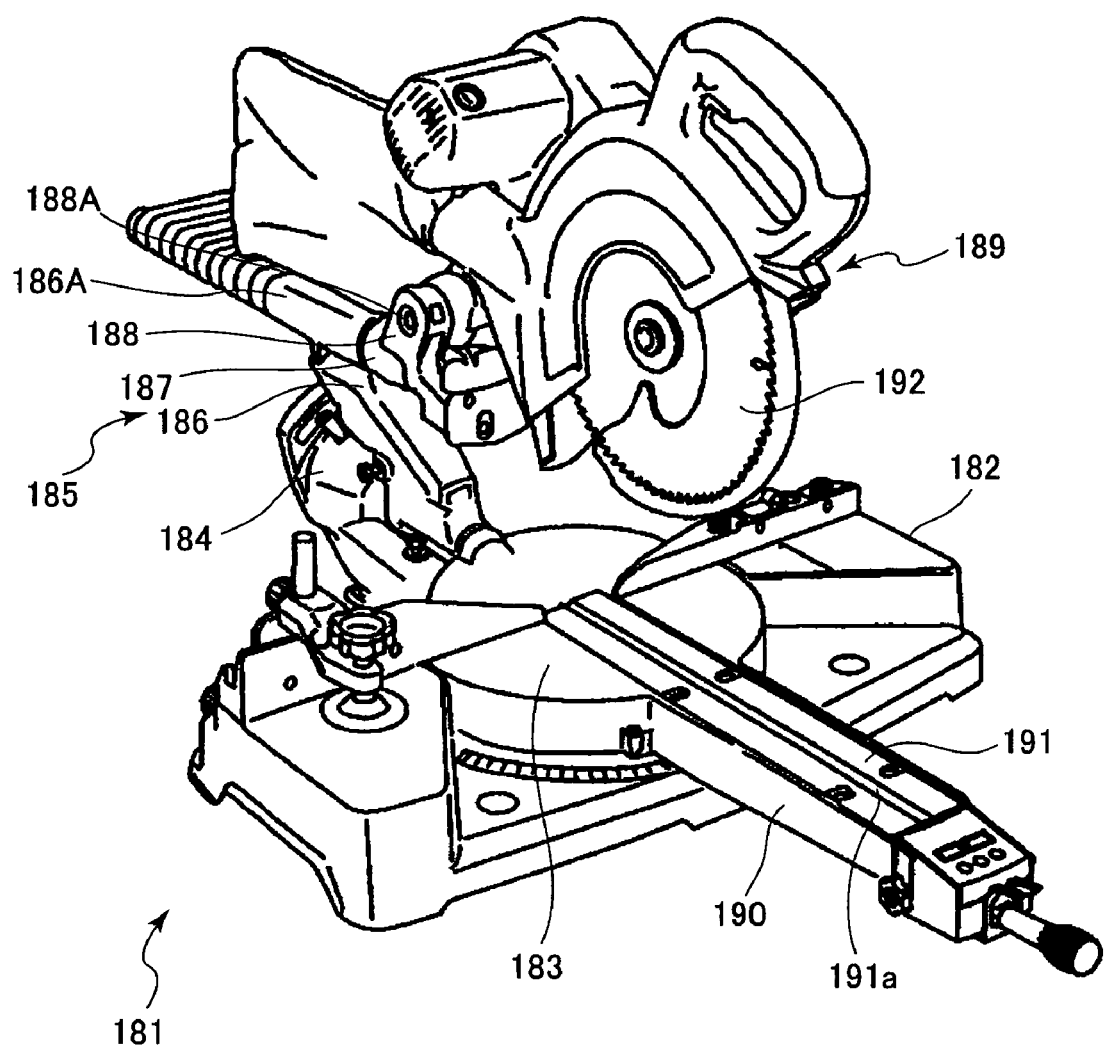
FIG. 45 shows a tenth modification and is a perspective view of a slide type miter saw.

A tenth modification is shown in FIG. 45. In the miter saw 1 according to the foregoing embodiments, the support section 3 pivotally movably extends from the base section 2 and is pivotally movably supports the circular saw unit 189. In a miter saw 181, a tilt support portion 184 integrally extends from a turntable 183. A support section 185 corresponding to the support section 3 includes a holder section 186, a slide section 187, and a saw unit support section 188.

The holder section 186 has a lower end pivotally movably supported to a turntable 183. A pivot axis of the holder section 186 is coincident with an upper surface of the turntable 183 and with a slit 191a of a slit plate 191 at a neck table section 190 of the turntable 183. The slit 191a is adapted to allow a circular saw blade 192 to be inserted therein when the circular saw unit 189 is moved toward the turntable 183. A pivot posture of the holder section 186 is changed and fixed relative to the tilt support section 184. The holder section 186 has an upper end portion provided with a slide guide portion 186A.

The slide section 187 has guide bars (not shown) movable in frontward/rearward direction and slidably supported by the slide guide portion 186A. The saw unit support section 188 is provided at a front end of the guide bars. The circular saw unit 189 is pivotally movably supported to the saw unit support section 188 through a support pin 188A. Thus, by the sliding movement of the slide section 187 relative to the holder section 186, the circular saw unit 189 is moved in the frontward/rearward direction at a position above the base 182 and the turntable 183. In such a miter saw 181, the angular rotation of the turntable 183 and the tilting motion of the circular saw unit 189 can be performed in the manner similar to the foregoing embodiments. According to this modification, since the circular saw unit 189 is movable in frontward/rearward direction, a workpiece having a greater size in frontward/rearward direction can be cut.

Further, various combinations are conceivable with respect to the above-described modifications. Further, various modification can be effected on the slide type miter saw 181.

What is claimed is:

1. A miter saw comprising:
   a base section that supports a workpiece thereon, the base section having a tilt support;
   a circular saw unit rotatably supporting a circular saw blade;
   a support section pivotally movably supporting the circular saw unit at a position above the base section, the support section having a tilting section laterally tiltingly movable together with the circular saw unit and supported to the base section, the tilt support supporting the tilting section in contact therewith, the tilting section being tiltingly movable along a tilting locus;
   a clamp mechanism that presses the tilting section against the tilt support for fixing a lateral tilting posture of the support section;
   a biasing member that provides a frictional force between the tilt support and the tilting section so as to resist movement of the tilting section; and
   a tilt amount fine control unit disposed between the tilting section and the tilt support, where the tilt amount fine control unit allows adjustment of a fine lateral tilting posture of the support section while the frictional force is being applied between the tilt support and the tilting section by the biasing member.

2. The miter saw as claimed in claim 1, wherein the tilt amount fine control unit comprises:
   an arcuate section provided at the tilting locus and movable integrally with the tilting section;
   a rotation shaft rotatably supported to the tilt support and associated with the arcuate section for tiltingly moving the tilting section; and
   an adjustment knob rotatably supported to the tilt support and associated with the rotation shaft for rotating the rotation shaft about an axis thereof.

3. The miter saw as claimed in claim 2, wherein the rotation shaft is drivingly connected to the arcuate section, and the adjustment knob is drivingly connected to the rotation shaft.

4. The miter saw as claimed in claim 2, wherein the rotation shaft is movable between an associating position where the rotation shaft is associatable with the arcuate section and a separated position where the rotation shaft is away from the arcuate section.

5. The miter saw as claimed in claim 2, wherein the clamp mechanism comprises a clamp shaft supported to the tilt support, and
   wherein the adjustment knob is rotatably supported on the clamp shaft.

6. The miter saw as claimed in claim 2, comprising a digital display that displays a tilting angle of the tilting section relative to the tilt support.

7. The miter saw as claimed in claim 6, wherein the base section comprises a base, and a turntable supported on the base and rotatable about a rotation axis relative to the base, the turntable comprising a circular table section having a front end and a rear end to which the support section is supported, and a neck table section extending frontwardly from the front end in a diametrical direction of the circular table section, the digital display being disposed at the neck table section.

8. The miter saw as claimed in claim 2, wherein the clamp mechanism is movable between a non-fixing position where the tilting motion of the tilting section relative to the tilt support is permitted and a fixing position where the tilting section is in intimate contact with the tilt support to prevent the tilting section from being tiltingly moved relative to the tilt support, rotation of the rotation shaft being prevented only when the clamp mechanism is at the fixing position.

9. The miter saw as claimed in claim 8, comprising a tilting motion restraining mechanism that restricts the tilting motion of the tilting section relative to the tilt support when the clamp mechanism is at the non-fixing position.

10. The miter saw as claimed in claim 2, wherein the adjustment knob provides a rotation angle greater than a tilting angle of the tilting section relative to the tilt support.

11. The miter saw as claimed in claim 1, wherein the support section comprises:
    a holder section having a lower end supported to the base section and having an upper end provided with a slide guide portion; and
    a slide section slidably supported by the slide guide portion and extending in a direction parallel with a line which is an intersection of the base section and the circular saw blade, the circular saw unit being pivotally movably supported to the slide section.

12. The miter saw as claimed in claim 1, wherein the tilt amount fine control unit comprises a gear mechanism including a gear portion that permits the tilting section to tilt a fine angle upon revolution of the gear portion, the gear mechanism being configured to perform adjustment of a fine tilting angle throughout an entire tiltable region of the tilting section.

13. A miter saw comprising:
   a base section that supports a workpiece thereon, the base section having a tilt support;
   a circular saw unit rotatably supporting a circular saw blade;
   a support section pivotally movably supporting the circular saw unit at a position above the base section, the support section having a tilting section laterally tiltingly movable together with the circular saw unit and supported to the base section, the tilt support supporting the tilting section in contact therewith, the tilting section being tiltingly movable along a tilting locus;
   a rotatable lever that fixes the tilting section to the tilt support upon rotating operation;
   a biasing member configures to provide a frictional force between the tilt support and the tilting section so as to resist a movement of the tilting section; and
   a rotatable adjustment knob movable along with the tilting section and associated with the tilt support, where the rotatable adjustment knob allows adjustment of a fine lateral tilting posture of the support section while the frictional force is being applied between the tilt support and the tilting section by the biasing member.

14. The miter saw as claimed in claim 13, wherein the lever and the adjustment knob provide a relationship that allows an operator to operate the lever at his one hand and to operate the adjustment knob at his another hand.

15. The miter saw as claimed in claim 13, further comprising a fine control unit comprising a gear mechanism connected to the rotatable adjustment knob, the fine control unit including a gear portion that permits the tilting section to tilt a fine angle upon revolution of the gear portion through operation of the rotatable adjustment knob, the gear mechanism being configured to perform adjustment of a fine tilting angle throughout an entire tiltable region of the tilting section.

* * * * *